(12) United States Patent
Zhou et al.

(10) Patent No.: US 10,521,776 B2
(45) Date of Patent: Dec. 31, 2019

(54) UN CURRENCY (VIRTUAL PAYMENT CARDS) ISSUED BY CENTRAL BANK OR OTHER ISSUER FOR MOBILE AND WEARABLE DEVICES

(71) Applicants: Andrew H B Zhou, Tiburon, CA (US); Tiger T G Zhou, Tiburon, CA (US); Zhou Tian Xing, Tiburon, CA (US)

(72) Inventors: Andrew H B Zhou, Tiburon, CA (US); Tiger T G Zhou, Tiburon, CA (US); Zhou Tian Xing, Tiburon, CA (US)

( * ) Notice: Subject to any disclaimer, the term of this patent is extended or adjusted under 35 U.S.C. 154(b) by 0 days.

(21) Appl. No.: 16/205,283

(22) Filed: Nov. 30, 2018

(65) Prior Publication Data

US 2019/0102756 A1 Apr. 4, 2019

Related U.S. Application Data

(63) Continuation-in-part of application No. 15/885,970, filed on Feb. 1, 2018, now Pat. No. 10,147,076, which
(Continued)

(51) Int. Cl.
*G06Q 20/06* (2012.01)
*G06K 7/14* (2006.01)
(Continued)

(52) U.S. Cl.
CPC ......... *G06Q 20/065* (2013.01); *G06K 7/1413* (2013.01); *G06K 7/1417* (2013.01); *G06K 19/06028* (2013.01); *G06K 19/06037* (2013.01); *G06Q 20/202* (2013.01); *G06Q 20/3223* (2013.01); *G06Q 20/3276* (2013.01);
(Continued)

(58) Field of Classification Search
CPC ............ G06Q 20/065; G06Q 20/4016; G06Q 20/3276; G06Q 20/3223; G06Q 20/202; G06Q 20/3278; G06K 7/1413; G06K 7/1417; G06K 19/06028; G06K 19/06037
See application file for complete search history.

(56) References Cited

U.S. PATENT DOCUMENTS 7,240,036 B1 * 7/2007 Mamdani ............... G06Q 20/04
705/75
9,361,616 B2 * 6/2016 Zhou .................... G06Q 20/382
(Continued)

*Primary Examiner* — Daniel I Walsh
(74) *Attorney, Agent, or Firm* — Georgiy L. Khayet

(57) ABSTRACT

Provided is a method for digital currency transfers via a mobile and wearable device. The method may include receiving a transfer request with a transfer amount in digital currency and user identification data associated with the user, retrieving payment data of the user associated with the identification data, generating an optical code encoding the payment data and the transfer amount. The method may continue with providing the optical code on a screen of the mobile and wearable device. On scanning of the optical code, a transfer receiving request is created. The method may continue with receiving a transfer receiving request to perform a payment transaction associated with the user, accessing a user account maintained by a currency issuance unit, and transferring the transfer amount in the digital currency from the user account to a recipient account associated with the recipient identification data.

20 Claims, 10 Drawing Sheets

Related U.S. Application Data is a continuation-in-part of application No. 15/486,709, filed on Apr. 13, 2017, now Pat. No. 10,055,714, which is a continuation-in-part of application No. 15/345,003, filed on Nov. 7, 2016, now Pat. No. 9,710,804, and a continuation-in-part of application No. 15/343,227, filed on Nov. 4, 2016, now Pat. No. 9,704,151, and a continuation-in-part of application No. 15/345,349, filed on Nov. 7, 2016, now Pat. No. 9,652,758, which is a continuation-in-part of application No. 14/957,644, filed on Dec. 3, 2015, now Pat. No. 9,489,671, which is a continuation-in-part of application No. 14/815,988, filed on Aug. 1, 2015, now Pat. No. 9,342,829, which is a continuation-in-part of application No. 13/760,214, filed on Feb. 6, 2013, now Pat. No. 9,016,565, which is a continuation-in-part of application No. 10/677,098, filed on Sep. 30, 2003, now Pat. No. 7,702,739.

(60) Provisional application No. 60/415,546, filed on Oct. 1, 2002.

(51) Int. Cl.
  *G06K 19/06* (2006.01)
  *G06Q 20/40* (2012.01)
  *G06Q 20/32* (2012.01)
  *G06Q 20/20* (2012.01)
  *H04L 9/30* (2006.01)

(52) U.S. Cl.
  CPC ..... *G06Q 20/3278* (2013.01); *G06Q 20/4016* (2013.01); *H04L 9/30* (2013.01)

(56) References Cited

U.S. PATENT DOCUMENTS

| | | | | |
|---|---|---|---|---|
| 9,563,890 | B2* | 2/2017 | Zhou | G06Q 20/3278 |
| 9,646,300 | B1* | 5/2017 | Zhou | G06Q 20/3224 |
| 9,704,151 | B2* | 7/2017 | Zhou | G06Q 20/3221 |
| 9,710,804 | B2* | 7/2017 | Zhou | G06Q 20/322 |
| 9,773,376 | B2* | 9/2017 | Rajput | G07F 17/3218 |
| 10,055,714 | B2* | 8/2018 | Zhou | G06Q 20/065 |
| 10,055,715 | B1* | 8/2018 | Grassadonia | G06Q 20/065 |
| 10,068,228 | B1* | 9/2018 | Winklevoss | G06Q 20/3829 |
| 10,204,378 | B1* | 2/2019 | Wnuk | G06Q 20/223 |
| 10,217,037 | B1* | 2/2019 | Di Iorio | G06K 19/041 |
| 2002/0023027 | A1* | 2/2002 | Simonds | G06K 7/1095 705/26.1 |
| 2010/0138344 | A1* | 6/2010 | Wong | G06Q 20/10 705/44 |
| 2011/0251892 | A1* | 10/2011 | Laracey | G06Q 30/0253 705/14.51 |
| 2012/0271712 | A1* | 10/2012 | Katzin | G06Q 30/06 705/14.51 |
| 2013/0006848 | A1* | 1/2013 | Kuttuva | G06Q 20/3223 705/39 |
| 2013/0238455 | A1* | 9/2013 | Laracey | G06Q 20/108 705/21 |
| 2013/0339253 | A1* | 12/2013 | Sincai | G06Q 20/3227 705/71 |
| 2014/0258127 | A1* | 9/2014 | Chava | G06Q 20/3276 705/44 |
| 2015/0026072 | A1* | 1/2015 | Zhou | H04M 1/72522 705/71 |
| 2015/0088674 | A1* | 3/2015 | Flurscheim | G06Q 20/3276 705/17 |
| 2015/0206128 | A1* | 7/2015 | Torossian | G06Q 20/3278 705/21 |
| 2015/0262137 | A1* | 9/2015 | Armstrong | G06Q 20/065 705/41 |
| 2015/0324764 | A1* | 11/2015 | Van Rooyen | G06Q 20/3276 705/69 |
| 2016/0140653 | A1* | 5/2016 | McKenzie | G06Q 40/02 705/69 |
| 2016/0162873 | A1* | 6/2016 | Zhou | G06Q 20/3227 705/67 |
| 2016/0203448 | A1* | 7/2016 | Metnick | G06Q 20/065 705/64 |
| 2016/0203572 | A1* | 7/2016 | McConaghy | G06F 21/10 705/58 |
| 2016/0260091 | A1* | 9/2016 | Tobias | G06Q 20/3678 |
| 2017/0053260 | A1* | 2/2017 | Zhou | G06Q 20/00 |
| 2017/0132630 | A1* | 5/2017 | Castinado | G06Q 20/4014 |
| 2017/0140346 | A1* | 5/2017 | Whitehouse | G06Q 20/3274 |
| 2017/0140371 | A1* | 5/2017 | Forzley | G06Q 20/381 |
| 2017/0154331 | A1* | 6/2017 | Voorhees | G06Q 20/3829 |
| 2017/0228704 | A1* | 8/2017 | Zhou | G06Q 20/065 |
| 2017/0262833 | A1* | 9/2017 | Xing | G06Q 20/023 |
| 2017/0286992 | A1* | 10/2017 | Lounsbury, Jr. | G06Q 30/0238 |
| 2018/0060860 | A1* | 3/2018 | Tian | G06Q 20/3674 |
| 2018/0117447 | A1* | 5/2018 | Tran | A63B 71/145 |
| 2018/0158036 | A1* | 6/2018 | Zhou | G09C 5/00 |
| 2018/0197172 | A1* | 7/2018 | Coburn | G06Q 10/00 |
| 2018/0240086 | A1* | 8/2018 | Sobotka | G06Q 20/06 |
| 2018/0240107 | A1* | 8/2018 | Andrade | G06Q 20/36 |
| 2018/0300364 | A1* | 10/2018 | Xu | G06Q 50/00 |
| 2018/0337882 | A1* | 11/2018 | Li | H04L 61/35 |
| 2019/0018984 | A1* | 1/2019 | Setty | G06F 21/64 |
| 2019/0102756 | A1* | 4/2019 | Zhou | G06Q 20/065 |
| 2019/0108517 | A1* | 4/2019 | Rose | G06Q 20/3829 |
| 2019/0164156 | A1* | 5/2019 | Lindemann | G06Q 20/065 |
| 2019/0238327 | A1* | 8/2019 | Li | G06F 16/1824 |
| 2019/0251524 | A1* | 8/2019 | Sadrizadeh | G06Q 20/065 |

\* cited by examiner

UN CURRENCY (VIRTUAL PAYMENT CARDS) ISSUED BY CENTRAL BANK OR OTHER ISSUER FOR MOBILE AND WEARABLE DEVICES

CROSS-REFERENCES TO RELATED APPLICATIONS

This application is a continuation-in-part of U.S. patent application Ser. No. 15/885,970, entitled "DIGITAL CURRENCY (VIRTUAL PAYMENT CARDS) ISSUED BY CENTRAL BANK FOR MOBILE AND WEARABLE DEVICES", filed on Feb. 1, 2018, U.S. patent application Ser. No. 15/345,003, entitled "VIRTUAL PAYMENT CARDS ISSUED BY BANKS FOR MOBILE AND WEARABLE DEVICES", filed on Nov. 7, 2016, U.S. patent application Ser. No. 15/343,227, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Nov. 4, 2016, U.S. patent application Ser. No. 15/486,709, entitled "DIGITAL CURRENCY (VIRTUAL PAYMENT CARDS) ISSUED BY CENTRAL BANK FOR MOBILE AND WEARABLE DEVICES", filed on Apr. 13, 2017, which is Continuation-in-Part of U.S. patent application Ser. No. 15/345,349, entitled "SYSTEMS AND METHODS FOR MESSAGING, CALLING, DIGITAL MULTIMEDIA CAPTURE AND PAYMENT TRANSACTIONS", filed on Nov. 7, 2016; which is a continuation-in-part of U.S. patent application Ser. No. 14/957,644, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Dec. 3, 2015, which is a continuation-in-part of U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 13/760,214, entitled "WEARABLE PERSONAL DIGITAL DEVICE FOR FACILITATING MOBILE DEVICE PAYMENTS AND PERSONAL USE", filed on Feb. 6, 2013, which is a continuation-in-part of U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to Provisional Application No. 60/415,546, entitled "DATA PROCESSING SYSTEM", filed on Oct. 1, 2002, which are incorporated herein by reference in their entirety.

FIELD

This application relates generally to data processing, and more specifically, to systems and methods for performing digital currency transfer via mobile and wearable devices.

BACKGROUND

In applying for a payment card, a customer usually has to physically visit a bank, spent some time there filling out a plurality of bank forms and standing in queues. Subsequently, the bank processes a credit card application by evaluating the creditworthiness of an applicant, verifying his credit history and employment information. In addition, the processing of payment cards, for example, carving names and card numbers on a credit card and storing magnetic information on a magnetic stripe of the card, takes a certain amount of time.

Thus, obtaining a payment card after filing an application may be a long-lasting procedure. However, customers may desire to receive a payment card immediately. Additionally, the customers may want to avoid formalities related to issuance of physical plastic payment cards and performing transfers.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure is related to a system and a method for digital currency transfers via a mobile and wearable device. According to one embodiment of the disclosure, a system for digital currency transfers via a mobile and wearable device may include a processor, a currency issuance unit, and a storage unit. The processor may be operable to receive a transfer request from the mobile and wearable device of a user. The request may include a transfer amount in digital currency and user identification data associated with the user. The processor may be further operable to retrieve, from a storage unit, payment data of the user associated with the identification data in response to the transfer request. The processor may be operable to generate an optical code encoding the payment data and the transfer amount and provide the optical code on a screen of the mobile and wearable device, wherein, on scanning of the optical code, a transfer receiving request is created. The processor may be further operable to receive a transfer receiving request to perform a payment transaction associated with the user. The transfer receiving request may include at least the payment data, the transfer amount, and recipient identification data associated with a recipient. The accessing of the user account maintained by a currency issuance unit may be based on the transfer receiving request. The processor may be further operable to transfer the transfer amount in the digital currency from the user account to a recipient account associated with the recipient identification data. The currency issuance unit may be operable to generate the digital currency based on the payment data associated with the user and the user identification data. The digital currency may have a deposit. The deposit may be equal to the transfer amount requested by the user in the transfer request. The currency issuance unit may be further operable to provide the digital currency to the user account. The storage unit may be operable to store at least the user identification information, the digital currency, and the recipient identification data. The processor, the mobile and wearable device, the currency issuance unit, and the storage unit are remotely located from each other and are in operable connection over the data network.

In another embodiment of the disclosure, a method for digital currency transfers via a mobile and wearable device is provided. The method may commence with receiving over a data network, by a processor, a transfer request. The request may be received from the mobile and wearable device of a user. The request may include a transfer amount and a user identification data associated with the identification data. In response to the transfer request, payment data of the user associated with the identification data may be retrieved from a storage unit. The method may continue with generating an optical code encoding the payment data and the transfer amount. The method may further continue with providing the optical code on a screen of the mobile and wearable device. On scanning of the optical code by a device of a receiver, a transfer receiving request may be created. The method may further continue with receiving a transfer receiving request to perform a payment transaction associated with the user. The transaction request may include at least the payment data, the transfer amount, and recipient identification data associated with a recipient. The accessing of the user account may be based on user authentication information provided by the user during registration with the system for digital currency transfers via a mobile and wearable device and stored on the mobile and wearable device. The user account may include a credit card account, a debit card account, a retail card account, a charge card account, a bank saving account, a bank checking account, an insurance account, a stored-value card account, a cryptocurrency account, and a digital mobile currency account. The method may continue with generating an optical code encoding the payment data and the transfer amount based on the retrieving. The optical code may be provided on a screen of the mobile and wearable device of the user for scanning by a device of a recipient. On scanning of the optical code, a transfer receiving request may be created. The method may continue receiving a transfer receiving request to perform a transfer transaction associated with the user. The transfer receiving request may include at least the payment data, the transfer amount, and recipient identification data associated with a recipient. The method may further continue with accessing a user account associated with the payment data of the user maintained by a currency issuance unit based on the transfer receiving request. The method may further include transferring the transfer amount in the digital currency to a recipient account associated with the recipient identification data. The processor, the mobile and wearable device, the currency issuance unit, and the storage unit may be remotely located with each other and be in operable connection over the data network.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
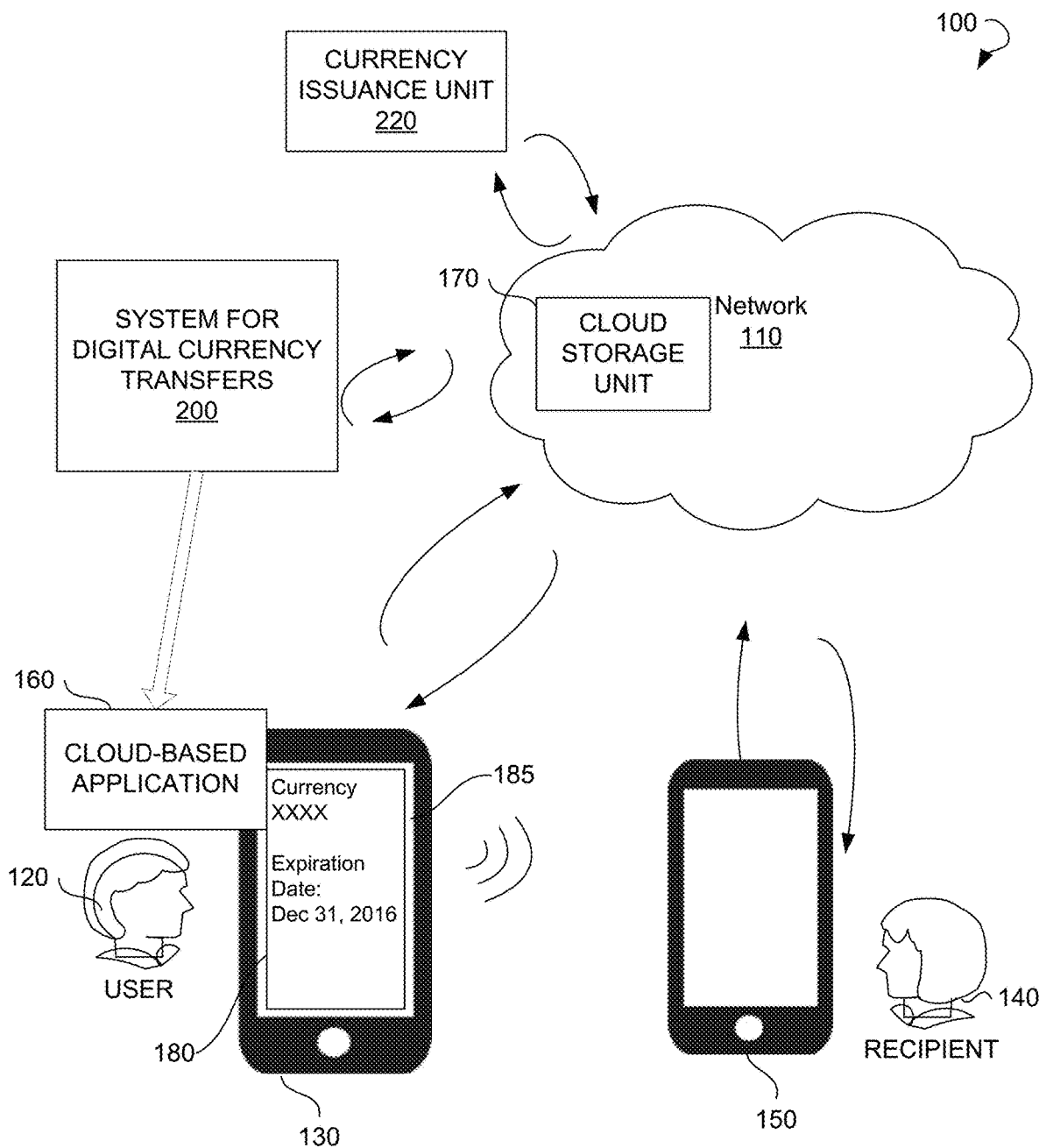
FIG. 1 is a block diagram showing an environment within which methods and systems for digital currency transfers via a mobile and wearable device can be implemented, in accordance with an example embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for digital currency transfers via a mobile and wearable device are described herein. The digital currency may be issued for a user based on financial data of the user stored or collected by a third-party organization. Therefore, though the user may have an account opened in the third-party organization, there may be no need to issue physical plastic currency, such as Visa, Master Card, American Express, and so forth.

The digital currency may be an electronically issued currency having a unique currency number. The unique currency number may be generated for a specific transaction only. The unique currency number may be electronically generated on request from a web service or a mobile application running on a mobile and wearable device of the user and being in communication with a currency issuance unit. The currency issuance unit may include a bank, Federal Reserve Bank, cryptocurrency issuance unit, or any other third-party organization. The digital currency may be issued for the exact amount of the transaction. Thus, the possibility of fraud related to the account of the user opened in the bank may be significantly reduced. Furthermore, though inherent risks involved with credit currency usage exist, a digital currency may eliminate the risk of compromising the account. More specifically, the digital currency may be generated for a specific transaction or for several transactions within a predetermined time and, after the transaction is completed, the digital currency may become invalid. Therefore, even though data associated with the digital currency may be stolen, the data of the account of the user in the bank cannot be accessed using the stolen data because the digital currency may be deactivated.

Additionally, the user may control spending parameters associated with the digital currency. More specifically, the user may set restrictions related to the digital currency. The restrictions may include a specific money amount allowed to be spent, a range of the money amount allowed to be spent, the number of times the digital currency can be used, such as for a one-time payment or for a payment within a predetermined time limit, persons allowed to use the digital currency, such as a primary holder of the account and a secondary holder of the account, places where the digital currency may be used, such as a specific merchant. By using the restrictions, a risk of an unauthorized use of the digital currency may be reduced.

The digital currency may be also useful for companies and businesses. More specifically, paying bills by a company using a digital currency may result in cost savings, such as money costs related to issuance of physical cards and time and resource saving related to actions taken by a staff of the company. Additionally, a rebate may be provided to the user or the company based on the amount of money spent using the digital currency.

Further, the user may make person-to-person transfers without revealing his banking details. Instead, payment data of the user may be provided in the form of a scannable optical code on a screen of a mobile and wearable device associated with the user.

Moreover, the user may monitor the amount of money spent using the digital currency. Since one digital currency unit is generated for each specific transaction, the generated digital currency may be electronically tracked and reconciled by the currency issuance unit and a report related to the use of digital currency may be provided to the user. Furthermore, analysis of the use of the digital currency by the user may be performed. The analysis may include evaluation of spending of money by the user for a specific time period, the list of recipients that accepted transfers using the digital currency, an average amount transferred to each of the recipients, and the like. In fact, the user may use the digital currency for performing payments related to electronic accounts associated with a plurality of merchants, corporate travel payments, mobile payments, person-to-person transfers, split payments, refunds, reimbursements, fees payments, and so forth.

Referring now to the drawings, FIG. 1 illustrates an environment 100 within which a system and a method for digital currency transfers via a mobile and wearable device can be implemented. The environment 100 may include a network 110, a user 120, a mobile and wearable device 130, a recipient 140, a device 150 associated with recipient 140, and a system 200 for digital currency transfers via a mobile and wearable device, also referred to as the system 200. The system 200 may have a distributed architecture including a cloud-based application 160 running on the mobile and wearable device 130, and a storage unit 170 associated with the mobile and wearable device 130 of the user 120. The mobile and wearable device 130 may include a smartphone, a wearable device (e.g., augmented reality glasses, a smart watch), a tablet computer, a lap top, and so forth.

The device 150 associated with recipient 140 may include a smartphone, a wearable device (e.g., augmented reality glasses, a smart watch), a tablet computer, a lap top, a payment terminal, such as a point of sale terminal, a credit card terminal, a card reader, and any other device that interfaces with currency to make electronic funds transfers and connects to a data network.

The user 120 may access the cloud-based application 160 via the mobile and wearable device 130. The cloud-based application 160 may be provided on a display of the mobile and wearable device 130, or may be projected or otherwise displayed by the mobile and wearable device 130 via a web browser or through another way. The cloud-based application 160 may provide to the user 120 the interface 185. The cloud-based application 160 may include a file hosting service, which may offer cloud storage, file synchronization, personal cloud, and client software.

The user 120 may register with the cloud-based application 160 on the mobile and wearable device 130. During registration, the user may specify user identification data, payment data, and authentication information. The payment data and authentication information may include information related to a credit card account, a debit card account, a charge card account, a bank saving account, a bank checking account, an insurance account, a stored-value card account, a cryptocurrency account, or a digital mobile currency account, or another payment facility of the user. The payment data may be stored in on the mobile and wearable device 130 and the storage unit 170 in association with the user identification data, and authentication information. Upon activation of the cloud-based application 160, the user 120 may initiate a transfer request 180 on the mobile and wearable device 130 and specify a transfer amount. Further, user identification data may be entered by the user 120, retrieved from the memory of the mobile and wearable device 130, or captured by sensors associated with the mobile and wearable device 130, such as fingerprints scanner or face recognition scanners. The transfer request 180 including at least the transfer amount and the user identification data may be sent to the system 200. In response to the transfer request 180, the system 200 may retrieve the payment data of the user 120 associated with the identification data from the storage unit 170.

In some embodiments, based on the transfer request 180 the currency issuance unit 220 may generate the digital currency and provide the digital currency to the account associated with the user. The digital currency may include a UN currency, also referred herein to as UNPAY currency (UNPAY).

Based on the payment data and the transfer amount, the system 200 may generate an optical code encoding the payment data and the transfer amount and transmit the optical code to the mobile and wearable device 130. The optical code may be provided on a screen of the mobile and wearable device 130 to be scanned by the device 150 associated with the recipient 140. The optical code may include a linear dimensional code, a two-dimensional code, a snap tag code, a Quick Response (QR) code, and a three-dimensional (3D) UNcode. The optical code may be integrated in a virtual payment card in the form of a virtual currency note. The virtual payment card may be personalized with an image associated with the user 120. On scanning of the optical code, the payment data and the transfer amount encoded in the optical code may be extracted.

Alternatively, the user 120 may put the mobile and wearable device 130 in a proximity to the device 150 to enable connection between the mobile and wearable device 130 and the device 150. The connection the mobile and wearable device 130 and the device 150 may be established through radio waves, contacts for direct electrical connection, data-strip reading, and so forth. The mobile and wearable device 130 and the device 150 may include one or more of a radio frequency identification chip, a Near Field Communication (NFC) chip, one or more contacts for direct electrical connection, a magnetic data strip, a holographic data strip, and so forth.

Upon establishment of the connection between the mobile and wearable device 130 and the device 150, the payment data and the transfer amount may be sent to the device 150 via the network 110.

Based on the payment data and the transfer amount extracted from the optical code or received via network 110 and recipient identification data stored on the device or entered by the recipient 140, a transfer receiving request may be created. The transfer receiving request may be then sent to the system 200. When the system 200 receives the transfer receiving request, the system 200 may access a user account maintained by the currency issuance unit 220. The transfer amount in the digital currency may be transferred to a recipient account associated with the recipient identification data.

The transfer performed using the digital currency may include an Internet payment, a scan code payment, a person-to-person payment, a buyer-to-merchant payment, a peer-to-peer payment, an in-application payment, a point-of-sale payment, a mobile payment, a wearable payment, a one-touch buying, and a digital wallet payment, and so forth. The payment details may be stored in the cloud storage 170, which may be associated with the currency issuance unit 220, and provided via the cloud-based application 160 in a form of a virtual payment card only to perform the transaction. Thus, the payment details of the user 120 may be protected from a theft or fraud.

Communication between the mobile and wearable device 130, the system 200, and the currency issuance unit 220 may be performed via a network 110. The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus connection or other wired or wireless, digital or analog interface or connection, mesh or Digi® networking. The network 110 may be a network of data processing nodes that are interconnected for the purpose of data communication.

The systems and methods described herein may also be practiced in a wide variety of network environments (represented by the network 110) including, for example, Transmission Control Protocol/Internet Protocol (TCP/IP)-based networks, telecommunications networks, wireless networks, etc. In addition, the computer program instructions may be stored in any type of computer-readable media. The program may be executed according to a variety of computing models including a client/server model, a peer-to-peer model, on a stand-alone computing device, or according to a distributed computing model in which various functionalities described herein may be effected or employed at different locations.

Figure 2:
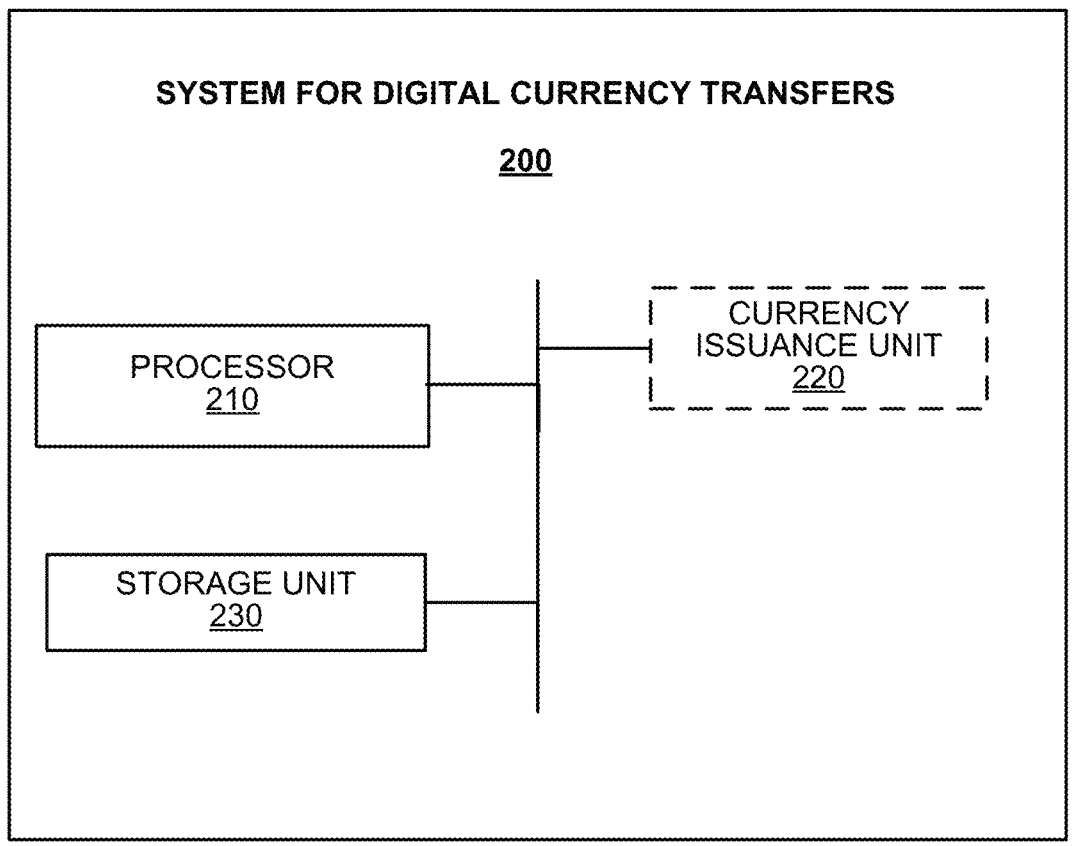
FIG. 2 is a block diagram showing a system for digital currency transfers via a mobile and wearable device, in accordance with an example embodiment.

FIG. 2 is a block diagram showing various modules of a system 200 for digital currency transfers via a mobile and wearable device, in accordance with certain embodiments. Specifically, the system 200 may include a processor 210, a currency issuance unit 220, and a storage unit 230. Operations performed by each of the processor 210, the currency issuance unit 220, and the storage unit 230 are described below with reference to FIG. 3. The storage unit 230 of the system 200 may be operable to store at least the user identification data, the user authentication information, the digital currency, the recipient identification data, and any other information related to the user, the recipient, or a payment transaction.

Figure 3:
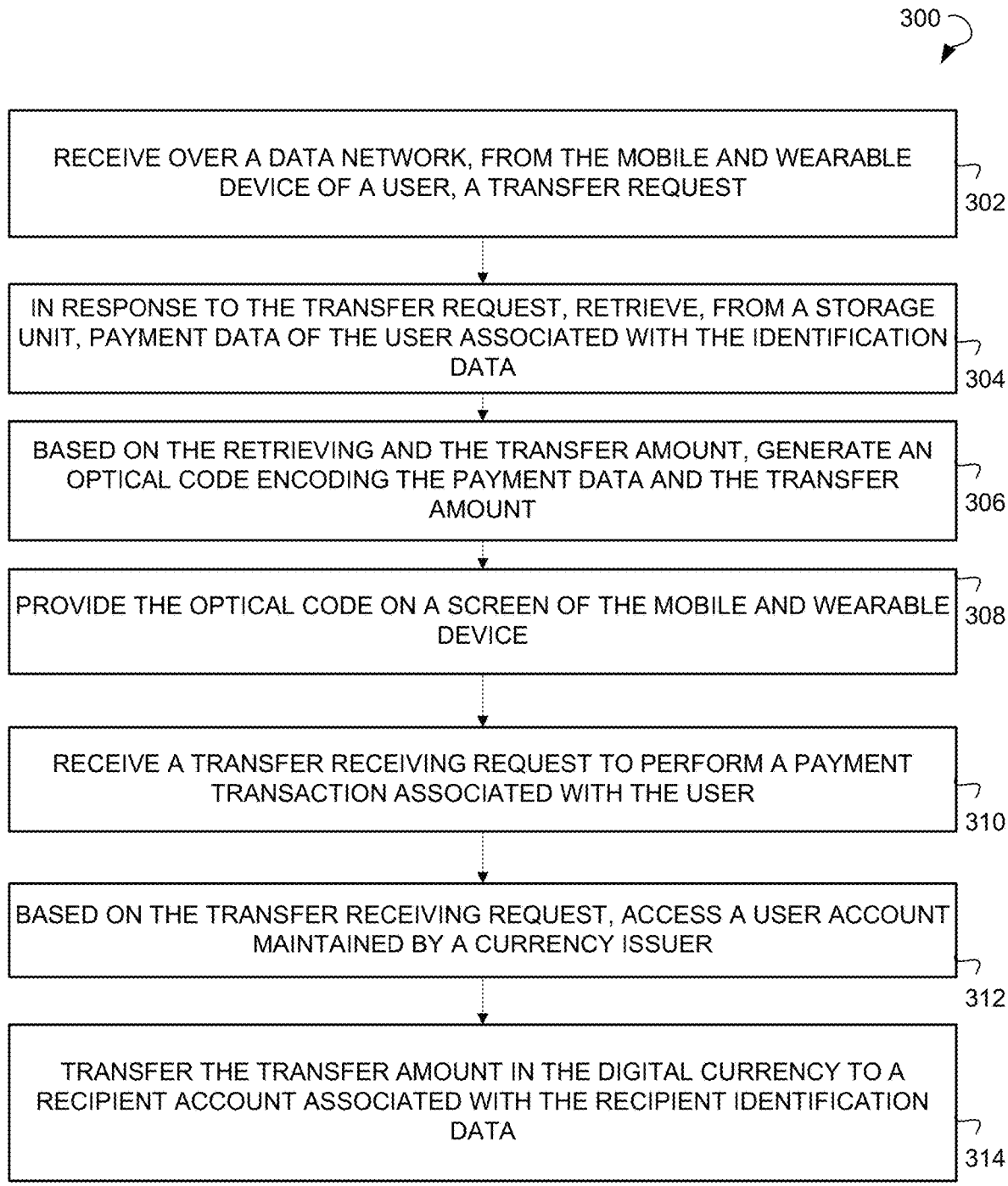
FIG. 3 is a flow chart illustrating a method for digital currency transfers via a mobile and wearable device, in accordance with an example embodiment.

FIG. 3 is a flow chart illustrating a method 300 for digital currency transfers via a mobile and wearable device, in accordance with certain embodiments. The method 300 may commence with receiving over a data network, by a processor, from the mobile and wearable device of a user, a transfer request at operation 302. Transfer request may include a transfer amount in digital currency and user identification data associated with the user. The digital currency may be issued based on the transfer request in the amount corresponding to the transfer amount and deposited to an account associated with the user.

In some embodiments, the user may be prompted to enter user authentication information. The user authentication information may be received from the user by the processor. In an example embodiment, the user authentication information includes one or more of the following: a name of the user, an address of the user, a guarantor name, a social security number of the user, a phone number of the user, an identification number of the user, a bank account of the user, an insurance account number of the user, a photograph of the user, an email account of the user, biometric authentication, and so forth. The biometric authentication may include one or more of a fingerprint authentication, authentication based on facial recognition, an iris pattern authentication, a heartbeat authentication, and a vein pattern identification. The vein pattern identification may be performed using scanning of one or more of the following: a palm vein pattern, a wrist vein pattern, a hand vein pattern, a leg vein pattern, a foot vein pattern, a neck vein pattern, and a head vein pattern. The fingerprint authentication may include scanning fingerprints of at least one finger of the user when the user touches one or more or the following: the display of the mobile and wearable device, a button of the mobile and wearable device, a rear panel of the mobile and wearable device, and the like. The fingerprint authentication may further include matching the fingerprints to one or more approved fingerprints. The one or more approved fingerprints may be stored in the cloud storage. Authentication based on facial recognition may include three-dimensional (3D) face recognition, where information of the shape of a face is captured using 3D sensors and compared to one or more approved faces. The one or more approved faces may be stored in the cloud storage.

The method may continue with retrieving, from a storage unit, payment data of the user associated with the identification data in response to the transfer request. The payment data may include a payment account associated with a credit card or a debit card of the user. In an example embodiment, the payment data may include data associated with one or more of the following: a credit card, a debit card, a retail card, a charge card, a bank saving account, a bank checking account, an insurance account, a stored-value card, a digital mobile currency, a cryptocurrency account, and so forth. The currency issuance unit may be selected from one or more of the following: a bank, Federal Reserve Bank, a credit card company, an insurance company, a credit union, a store, a third-party organization, a public transaction database, a distributed ledger, and so forth.

The method 300 may further include an operation 306, at which based on the retrieving, an optical code encoding the payment data and the transfer amount is generated. At operation 308, the optical code may be provided on a screen of the mobile and wearable device. The optical code may include one or more of the following: a linear dimensional code, a two-dimensional code, a snap tag code, a QR code, 3D UNcode, and so forth. The optical code may be included in a virtual payment card associated with the transfer amount and the digital currency. The virtual payment card may be displayed via an interface of the mobile and wearable device. The virtual payment card may be read by a device associated with the recipient. In a further example embodiment, the payment data and the transfer amount associated with the transfer may be transmitted from the mobile and wearable device to the device associated with the recipient using an NFC upon bringing the mobile and wearable device and the device associated with the recipient into proximity to each other.

More specifically, the method 300 may include receiving an indication that the user brings the mobile and wearable device in proximity to the device associated to initiate sending data related to the transfer to the recipient. The indication may be received based on sensing an interaction of the mobile and wearable device with the merchant device. The interaction may include at least an NFC. The NFC may be used to pair the mobile and wearable device and the device upon bringing the mobile and wearable device into proximity to the device. The mobile and wearable device and the device may be connected to a cloud network. Upon pairing the mobile and wearable device with the device, at least a Bluetooth connection between the mobile and wearable device and the device may be established.

On obtaining the payment data and the transfer amount, a transfer receiving request may be created using the payment data, the transfer amount, and the recipient identification data.

The method 300 may further include, receiving a transfer receiving request to perform a payment transaction associated with the user at operation 310. The transaction request may include at least the payment data, the transfer amount, and recipient identification data associated with a recipient. The recipient identification data may be retrieved from the device associated with the recipient.

Further, the method may include accessing, by the processor, a user account maintained by a currency issuance unit at operation 312. The accessing may be performed based on the user authentication information provided by the user.

Digital currency is an asset represented in the digital form and having one or more monetary characteristics. Digital currency may be denominated to a sovereign currency and issued by a currency issuance unit responsible to redeem digital money for cash. Digital currency issued by country Central Bank (e.g. Federal Reserve Bank, European Central Bank, Bank of Canada, People's Bank of China, a central bank of 206 countries, other legal authorities, etc.) is a legal tender. Similar to the paper notes and coins, digital currency or digital money exhibits properties. At the same time the digital currency may allow for instantaneous transactions and borderless transfer-of-ownership. Both virtual currencies and cryptocurrencies are types of digital currencies. Like traditional money, the virtual or digital currency may be used to buy physical goods and services while being restricted to certain communities, such as, for example for use inside an on-line game community or a social network.

There are more than trillion United States currency banknotes issued. An estimated cost for printing and circulation of every paper note is about 25 cents. Every five years a paper note must be reprinted again. In contrast to a paper note, the price of issuing digital money may be less than one cent. The use of digital currency may reduce the number of bank branches and ATM machines. Issuing digital currency per client request using client's mobile device may result in replacing transactions performed via physical plastic cards with transactions in digital currency.

In the present disclosure, the terms "UN currency" and "UN currency" mean "universal currency," "united currency," or "union currency." The terms "universal currency," "united currency," and "union currency" may be used interchangeably throughout the present disclosure and refer to digital currency that may include a universal currency used in a plurality of countries (e.g., all counties of the words, a portion countries of the word), a plurality of geographic regions, continents, or parts of the world (e.g., Europe, Asia, Eurasia, America, Oceania, and the like), and one or more currency unions (e.g., Eurozone). For example, the euro is the official currency of 19 of 28 member states of the European Union and some of the territories of the European Union, this group of states is known as the eurozone or euro area. Similarly, to the euro used in a number of countries, the UN currency may be used throughout the whole world. In an example embodiment, the UN currency may include one or more of physical currency available in form of banknotes and coins and digital currency available in digital form. Therefore, the UN currency may be an official digital currency of a group of 206 countries and one or more territories of the Earth. The group of countries may be known as a UN zone or a UN area and may be associated with the largest most traded digital currency market.

The UN currency may facilitate electronic funds transfers throughout the world using one or more of UN-branded credit cards, gift cards, and debit cards, UN issues cards, extend credits and set rates and fees for customer. The UN currency may provide financial institutions with UN-branded payment products to be uses to offer credits, debits, prepaid and cash-access programs to the customers. Transaction in the UN currency worldwide may be processed through an UNPAY Net system at one or more secure facilities. The UN currency may be associated with UN data centers secured against natural disasters, crime, and terrorism, that may operate independently of each other and from external utilities, handle up to 35,000 simultaneous transactions and up to 100 billion computations every second. Every transaction may be checked past 500 variables including 100 fraud-detection parameters including a location and spending habits of the customers and a merchant location.

The UN currency may be associated with signed copies of sales drafts included in each customer monthly billing statement for verification purposes. The UN currency may be associated with a summary statement showing a posting date, a purchase date, a reference number, a merchant name, and a dollar amount of each purchase. The UN currency may be further associated with a calculation of a finance charge on an unpaid balance shown on a prior month statement, wherein the UN currency is associated with an average daily balance resulting in increased revenue for issuers by calculating a number of days each purchase was included on a prior month statement, in which transactions from previous and current billing cycles were used in the calculation. The UNPAY currency may have a set of rules that govern a participation of financial institutions in a payment system associated with UNPAY currency. Acquiring banks may be responsible for ensuring that merchants comply with the rules. The rules associated with the UNPAY currency may address how a device holder or the cardholder is to be identified for security, how transactions are denied by a bank and how banks cooperate for fraud prevention, and how to keep identification and fraud protection standard and non-discriminatory. The rules may govern what creates an enforceable proof of authorization by the device holder or the cardholder. Furthermore, the rules associated with the UNPAY currency may prohibit merchants from imposing a minimum or maximum purchase amount in order to accept, by a user of a mobile or wearable device, from charging device holders, a fee for using UN virtual card payments. Additionally, a discount for users of the UNPAY currency may be permitted under the rules. Furthermore, the rules associated with the UNPAY currency may permit merchants to ask for a photo identification (ID). When the UN virtual card is signed, a merchant may not deny a transaction if a UN virtual cardholder refuses to show the photo ID. The rules may further include addition of exceptions for non-signed purchases by telephone or on the Internet, and an additional security system for purchases on the Internet is enforced.

The UNPAY currency may be associated with a contact-less payment technology enabling device holders to wave a wearable device in front of contactless payment terminals without the need to physically swipe or insert a virtual card into a point-of-sale device, using RFID technology. The UNPAY currency may be associated with a chip-only and a PIN-only debit card.

Additionally, the UNPAY currency may be associated with a mobile payment application or a wearable device application enabling payments via smartphones using a QR code and machine readable codes. In addition, the UNPAY currency may be associated with an UNPAY checkout system including an online or offline payment system for removing the need to share card details with retailers. The UNPAY checkout system may enable users to enter all user personal details and card information upfront, use a single username and password to make purchases from online or offline retailers. The UNPAY checkout system may work with credit cards, debit cards, and prepaid cards. The rules associated with the UNPAY currency may stipulate a user signature requirement to be optional for all Europay, MasterCard and VISA (EMV) contact or contactless chip-enabled merchants, thereby leading to a faster in-store purchase experience of the customers.

The method 300 may continue with transferring the transfer amount in the digital currency to a recipient account associated with the recipient identification data at operation 314.

In an example embodiment, the transfer may be associated with an internet payment, an NFC payment, a scan code payment, a person-to-person payment, a buyer-to-merchant payment, a peer-to-peer payment, an in-application payment, a point-of-sale payment, a mobile payment, a wearable payment, a digital wallet payment, and so forth.

Based on the transfer of the transfer amount, the processor may determine that the transfer associated with the user is completed.

In an example embodiment, the processor may deactivate the digital currency based on the determining that the transfer is completed.

In an example embodiment, the method 300 may include encrypting the transfer request to obtain an encrypted transfer request. The encrypting of the transfer request may include generating a one-time code. The one-time code may encode at least the user identification data and the transfer amount.

In an example embodiment, the transfer receiving request may be authorized when a geographic location determined by the mobile and wearable device matches a geographic location of the recipient at a time of receiving the transfer receiving request.

In further example embodiments, the method 300 may include securing the mobile and wearable device via a band to a part of a human body. The part of the human body may include one or more of the following: a wrist, an arm, a neck, a bead, a leg, a waist, an ear, and a finger. The mobile and wearable device may be secured under, within or on clothing.

In further example embodiments, the method 300 may include setting, by the currency issuance unit, a validity period for the digital currency. The validity period may be pre-selected by the user and stored in the user account. In this embodiment, the deactivation of the digital currency may be performed upon expiration of the validity period.

In some example embodiments, the cloud-based application may include one or more of the following: a media player, a multimedia library, an online radio broadcaster, an online store selling software applications for the mobile and wearable device, and a mobile and wearable device management application to play, download, purchase, organize multimedia, send multimedia gift cards, and synchronize the multimedia with a portable device and one or more internet-connected devices. The cloud-based application may be configured to prompt the user to purchase and download one or more or the following: music, music videos, television shows, audio books, movies, movie rentals, and the like.

In further example embodiments, the cloud-based application may reside in the cloud network and may be provided on the mobile and wearable device via a web browser, a projector, or a hologram. The cloud-based application may be provided for purchase in one or more applications stores. The one or more applications stores may be associated with an operating system including one of the following: Microsoft Windows, Linux, Android, Blackberry, iOS, Windows Phone, and so forth. In some example embodiments, the cloud-based application may be provided free of charge or at a predetermined price.

In a further example embodiment, the digital currency may be associated with a joint operation with banks and top retailers. Additionally, the cloud-based application running on the mobile and wearable device may reside in a cloud network and may be provided on the mobile and wearable device via one or more of the following: a web browser, a projector, and a hologram, an augmented reality (AR) device, and a virtual reality (VR) device. The cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone. The cloud-based application may be provided free of charge or at a predetermined price. The cloud-based application may include at least a bank account emulation (BAE) client, the BAE client is configured to provide emulation of a bank account to combine with cloud computing and provide an emulated digital currency. The bank account may be emulated based on metadata associated with the user, a phone number associated with the user, and data associated with a point-of-sale (POS) terminal of the merchant. The BAE client may be configured to provide a virtual representation of an emulated bank account.

The operating system associated with the mobile and wearable device may be configured to run the BAE client, provide two communication paths for NFC commands from the POS terminal based on an application identifier (AID) associated with the BAE client. The operating system may be further configured to use the AID to route the NFC commands to the cloud-based application managing the emulation of the bank account.

When the user presents the emulated digital currency for transaction, an NFC command may be routed to the BAE client for verification of the NFC commands by the cloud-based application managing the emulation of the bank account.

The cloud-based application may be configured to connect to a backend associated with the currency issuance unit to complete the transaction. The cloud-based application may be associated with a trusted tokenization node. The trusted tokenization node may be a shared resource used to generate and de-tokenize tokens representing data associated with the digital currency at the backend associated with the issuer. The BAE client may provide multi-level security by providing limited use keys, tokenization, device fingerprinting, and dynamic risk analysis. The limited use keys may be derived from a master domain key shared by the issuer. A use of the limited use keys may be associated with time to live of the limited use keys and a number of transactions to be performed using the limited use keys. The device fingerprints may be profiles associated with the mobile and wearable device and are used to determine that transactions are initiated only by an authorized mobile and wearable device at recognized locations of the POS terminal.

Figure 4:
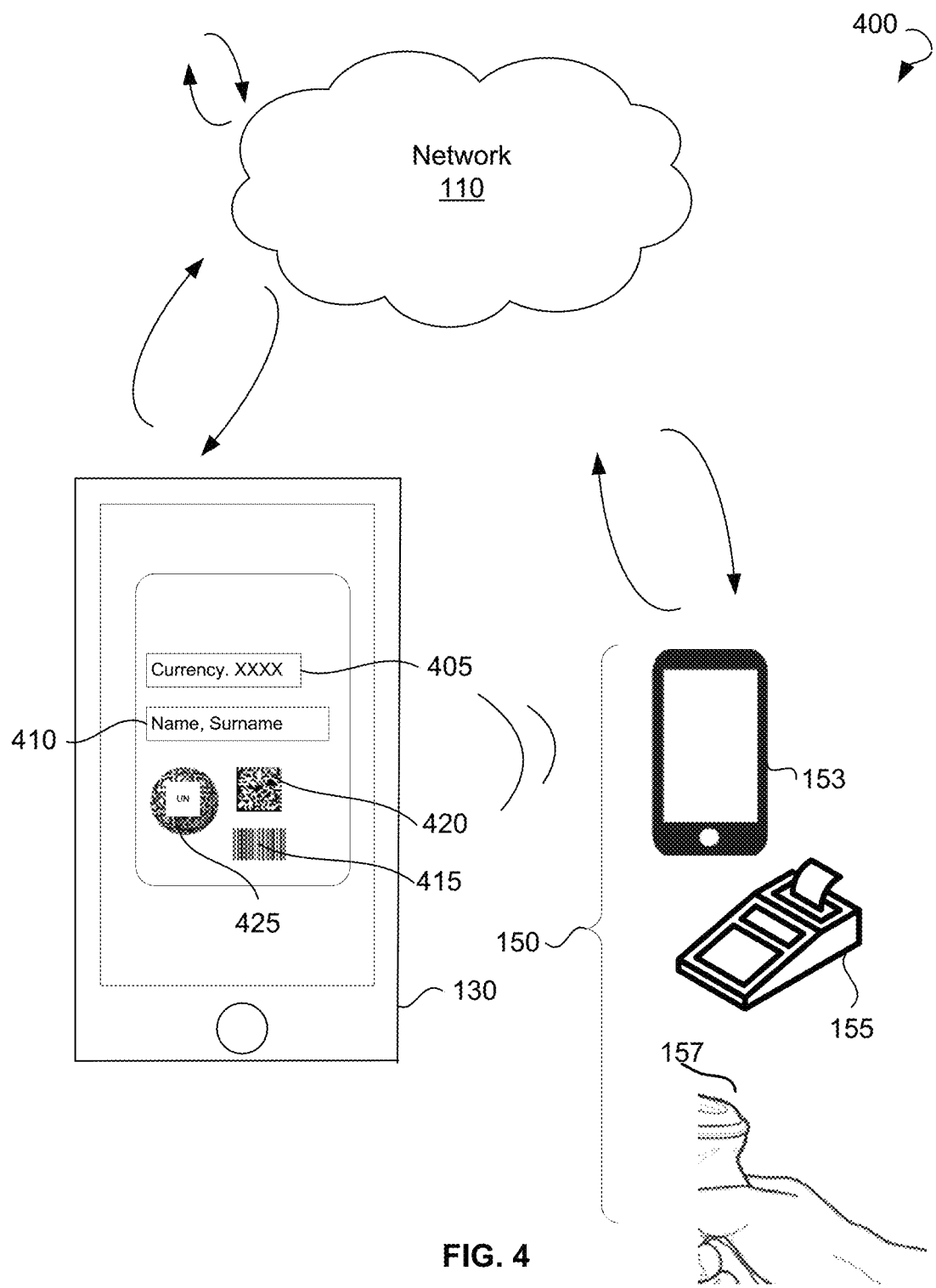
FIG. 4 illustrates a schematic diagram of an interaction of a mobile and wearable device and a device associated with a recipient during a digital currency transfer, in accordance with an example embodiment.

FIG. 4 is a schematic representation 400 of an interaction of a mobile and wearable device and a device during a digital currency transfer, in accordance with an example embodiment. In an example embodiment, a user initiates a transfer request, for example, by activating a cloud-based application (not shown) running on the mobile and wearable device 130. The transfer request may be sent to the system 200 via the network 110. The system 200 may generate an optical code encoding the payment data and the transfer amount in digital currency.

The optical code may be provided on a screen of the mobile and wearable device 130. The user may bring the mobile and wearable device 130 in proximity of the device 150 associated with the recipient so that the mobile and wearable device 130 and the device 150 may establish a connection via scanning, NFC, RFID, and so forth. When the interaction is determined by the device 150, the device 150 may receive data associated with the transfer from the mobile and wearable device 130. In an example embodiment, the device 150 may include a mobile device 153, a point-of-sale card reader 155, a barcode reader 157, and so forth.

In an example embodiment, the data associated with the transfer may include a currency number 405, a name 410 of the user, and a code, such a barcode 415, a QR code 420, or a 3D UNcode 425. The 3D UNcode 425 may be associated with theUNPAY, a virtual currency issued and controlled by developers of the UNPAY, and used and accepted among members of a virtual community associated with the UNPAY.

The 3D UNcode may be readable by an imaging device and may include a round global circle and squares arranged in a round circle grid on a white background. Further, the 3D UNcode may be a machine-readable optical label encoding information in horizontal, vertical, and 3D components of the round global circle and squares arranged in a round circle grid. The information may be encoded using five standardized encoding modes including globeing, numeric, alphanumeric, byte/binary, and kanji to store data.

The application of the 3D UNcode may include product tracking, item identification, time tracking, document management, general marketing, payments, storing bank account information or credit card information, cryptographic currencies, and so forth. Payment addresses, cryptographic keys, and transaction information may be shared between digital wallets using the 3D UNcode.

Upon receipt of the data associated with the transfer, the device 150 may send the data associated with the transfer and the recipient identification information to the system 200 to complete the transaction.

The present disclosure further relates to a computer implemented method for multimedia capture, payment transactions, digital global ledger and national currency digital token for mobile and wearable devices. The method may include receiving, by one or more processors, a first input of a user. In response to the first input of the user, one or more sensors may be initiated to capture multimedia to obtain captured multimedia. The method may continue with receiving, by the one or more processors, a second input of the user. The first input of the user may include a touch engagement of the user with a display of a mobile and wearable device and the second input of the user may include a touch release of the user from the display of the mobile and wearable device. The method may further include analyzing, by the one or more processors, data associated with the first input of the user and the second input of the user. The analyzing may include determining time between the first input of the user and the second input of the user. Based on the analysis, a multimedia capture mode or a payment transaction mode may be selectively selected. The multimedia capture mode may be used to capture multimedia content. The selection of the multimedia capture mode and the transaction mode may be determined by comparison of the time between the first input and the second input with a predetermined time. Only a multimedia storing mode or a transaction mode can be selected at a single time. The multimedia capture mode may be associated with a plurality of types of multimedia. Each of the plurality of types of multimedia may be determined by the time between the first input and second input in the multimedia capture mode. Furthermore, based on the analysis, one of multimedia storing modes or a payment transaction mode may be selectively selected by the one or more processors. Each of the multimedia storing modes may be associated with at least one of a plurality of types of the multimedia. In response to the selection of the multimedia capture storing modes, the captured multimedia may be processed to obtain a type of the multimedia captured in the multimedia capture mode.

The method may continue with storing the type of the multimedia captured and the captured multimedia to a database to obtain a stored type of the multimedia. The method may further include receiving, in response to the selection of the payment transaction mode, transaction data.

The transaction data may include at least a payment amount and a recipient. Based on the transaction data, user payment data, and recipient payment data, a payment transaction may be performed. The user payment data and the recipient payment data may be stored in the database.

The mobile and wearable devices may include at least one of a handheld computing device, a smartphone, a tablet computer, a personal digital assistant, a e-textile item, an activity tracker, a smartwatch, smartglasses, a Global Positioning System (GPS) watch, a mixed reality device, a computer-mediated reality device, a clothing technology device, and a wearable device, the wearable device having a band adapted to secure the wearable device on a human body, the human body may include a wrist, an arm, a neck, a head, a leg, a waist, an ear, a finger, and any other part of the human body. The band may be adapted to secure the wearable device under, within or on clothing, and wherein the band includes a rechargeable battery configured to power the wearable device.

The method may further include the use of a digital currency. More specifically, the method may include receiving, by at least one processor, a transfer request. The transfer request may be authorized upon receiving authorization data from a sender having a sender account from which funds are transferred from. The authorization data may include a password, personal identification number (PIN) code, and biometric data comprising a face of the sender. Based on the receiving, the sender may be authorized to provide the transfer request when the authorization data provided for the transfer request matches previously registered corresponding authorization data. The transfer may be associated with an amount represented in tokens of the digital currency stored on the mobile and wearable device of the sender. The transfer request may include at least the sender account, a recipient account, and the amount. Based on the transfer request, prior to transferring, the digital currency may be encrypted by assigning a unique key to the transferring and signing the digital currency using a cryptographic signature the amount from the sender account to the recipient account. The tokens stored on the mobile and wearable device of the sender may be printed with a face of the sender. Upon transfer from the mobile and wearable device of the sender to a mobile and wearable device of the recipient, the tokens may be converted by replacing the senders face with the recipient face. The digital currency may be not a currency of any national government but may be operable to be exchanged by the mobile device into a user defined national currency.

Transactions in the digital currency between parties may be recorded in a distributed world global digital currency ledger. The distributed world global digital currency ledger may be programmed to trigger transactions between the parties automatically using a peer-to-peer network, a distributed timestamping server, and a code block file chain database including a transaction database for using the digital currency. The digital currency may be associated with an exchange rate between two digital currencies. The exchange rate is a rate at which one digital currency is exchanged for another digital currency. The exchange rate may be determined in a foreign exchange market, the foreign exchange market being open to a plurality of types of buyers and sellers. A currency trading may be continuous, i.e. may last for days and nights without interruption. The exchange rate may include a spot exchange rate associated with a current exchange rate. The exchange rate may further include a forward exchange rate including an exchange rate that is quoted and traded on a current date for delivery and payment on a specific future date. The exchange rate may further include a buying rate and a selling rate. The buying rate is a rate at which a person buys foreign currency in exchange for the digital currency, and the selling rate is a rate at which the person sells the digital currency.

Figure 5:
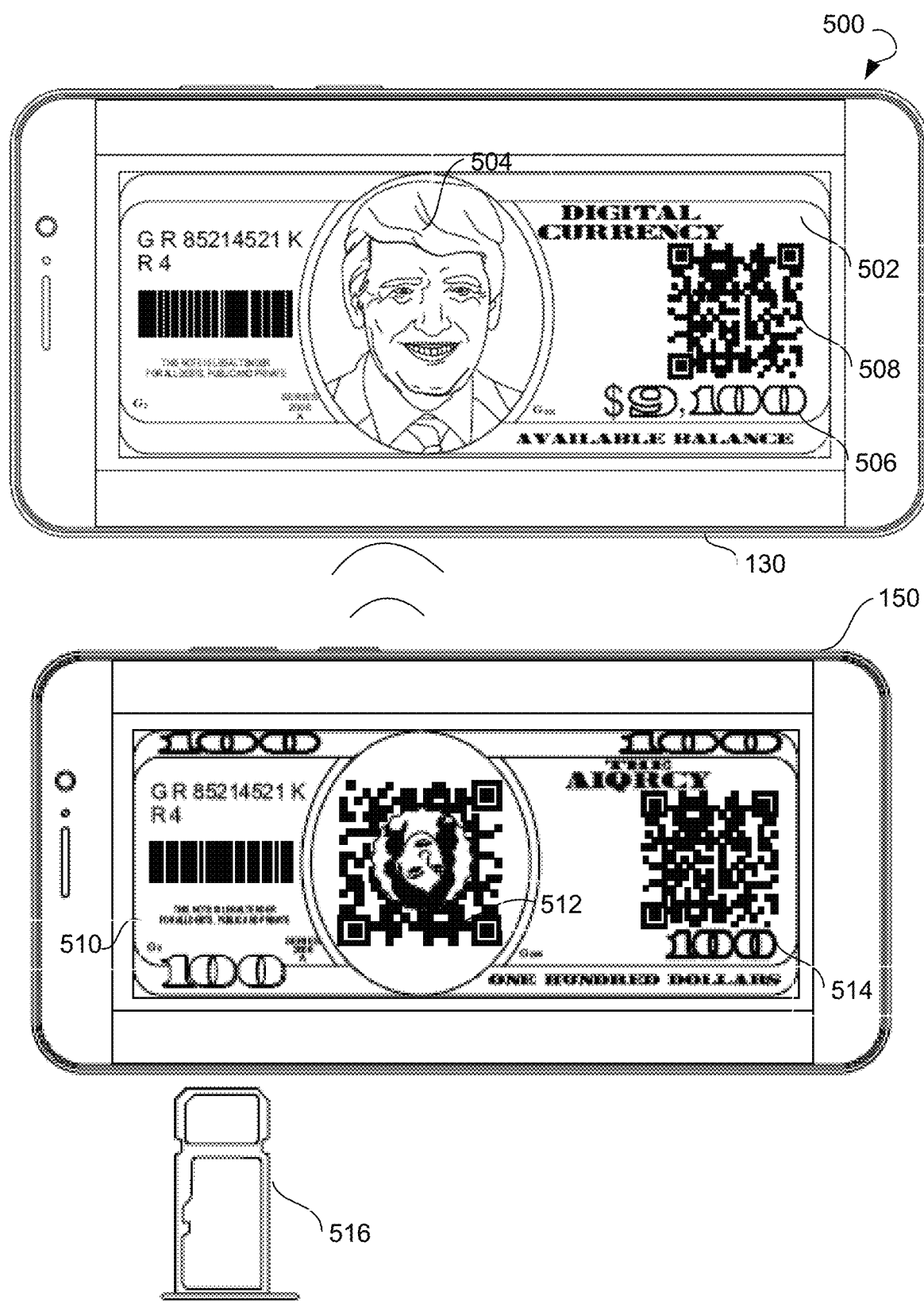
FIG. 5 illustrates a schematic representation of interactions between a user device and a device associated with the recipient, in accordance with an example embodiment.

FIG. 5 illustrates a schematic representation 500 of interactions between a user device 130 and a device 150 associated with the recipient, in accordance with an example embodiment. The screen of the user device 130 may display a virtual payment card 502 representing the digital currency, in which the transfer is being performed. Though the digital currency may be available only in digital form and may have no physical form, virtual payment cards representing the digital currency may be similar to a note of physical currency, for example, a US currency banknote. Additionally, the virtual payment cards may provide personalization options not available with physical currency banknotes even for governors or presidents of the countries issuing the physical currency. For example, the user may his face on a virtual currency card resembling a banknote of a physical currency as shown on FIG. 5.

Further, a virtual payment card may include two sides, one showing a total balance on an account associated with the user and resembling a banknote of a physical currency personalized with an image provided by the user, for example, an image of the President of the United States of America, Donald Trump. The other side may be provided on a touch interaction with the screen of user device 130 and personalized with an image of the user to authorize the transaction based on face recognition.

The virtual payment card 502 may include an image 504 associated with the user, a transfer amount 506, and an optical code 508 encoding transfer data.

Upon scanning of the optical code 508 by the device 150, the transfer data is derived from the optical code 508. Based on the deriving, a virtual payment card 510 may be generated and displayed on the screen of the device 150 via the interface of the cloud-based application related to the recipient. In an example embodiment, the virtual payment card 510 may be personalized with an image 512 associated with the recipient. Further, the transfer amount 506 may be converted based on a currency associated with the cloud-based application related to the recipient. The virtual payment card 510 may include a converted amount 514. Further, the device 150 may include a Subscriber Identity Module card 516, via which the device 150 may communicate with the network.

Figure 6:
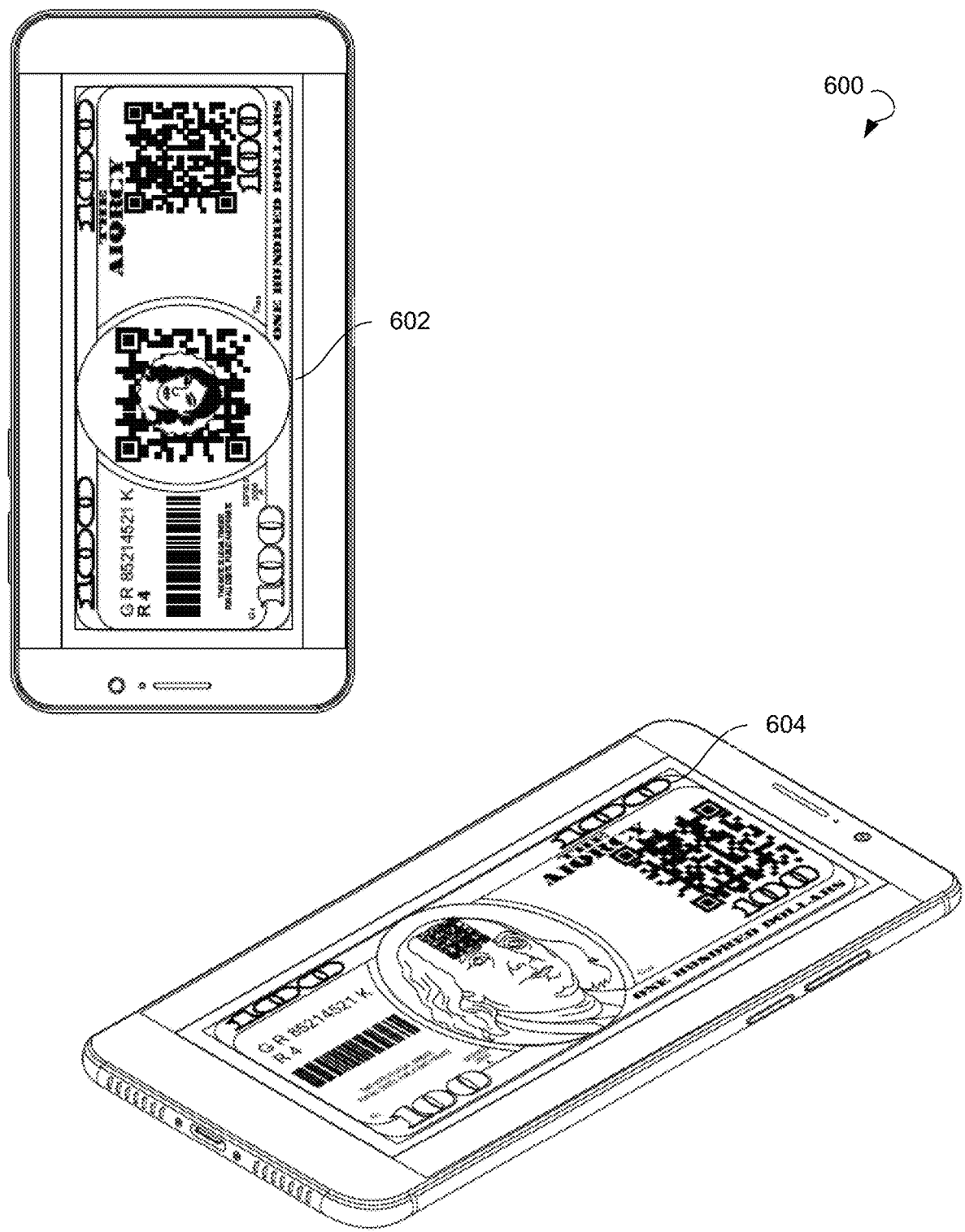
FIG. 6 illustrates further representations of virtual payment cards, in accordance with an example embodiment.

FIG. 6 illustrates further representations 600 of virtual payment cards, in accordance with an example embodiment. A virtual payment card 602 may be personalized using an image embedded in an optical code. The user may provide at least one image to be depicted on the virtual payment card 602. The image may include an image of a face of the user, an image of a public figure, e.g. current President Donald Trump, an image of a movie character, and other images with optical code like 1D, 2D and 3D UNcode associated with UNPAY.

In another embodiment, a virtual payment card 604 may be similar to a note in a physical currency. The virtual payment card 604 may include one or more optical codes.

Figure 7:
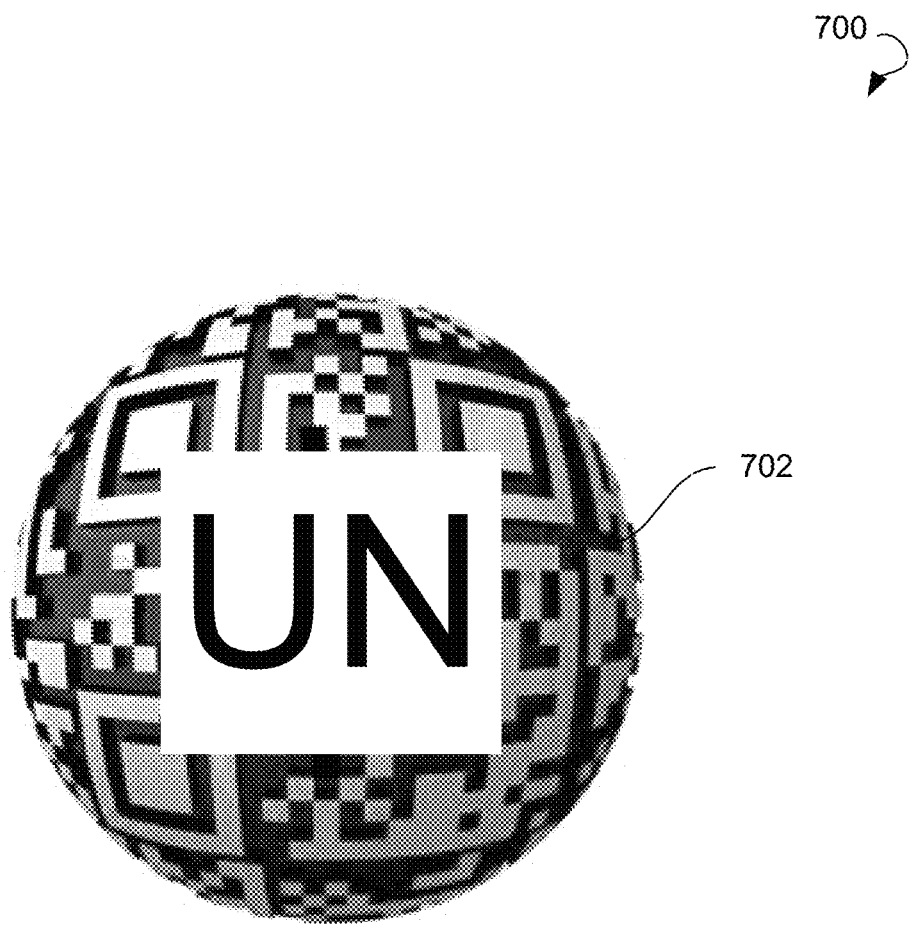
FIG. 7 illustrates a schematic representation of UNcode, in accordance with an example embodiment.

FIG. 7 illustrates a schematic representation 700 of UNcode 702, in accordance with an example embodiment. The UNcode 702 may include a three-dimensional representation of data readable by machine.

Figure 8:
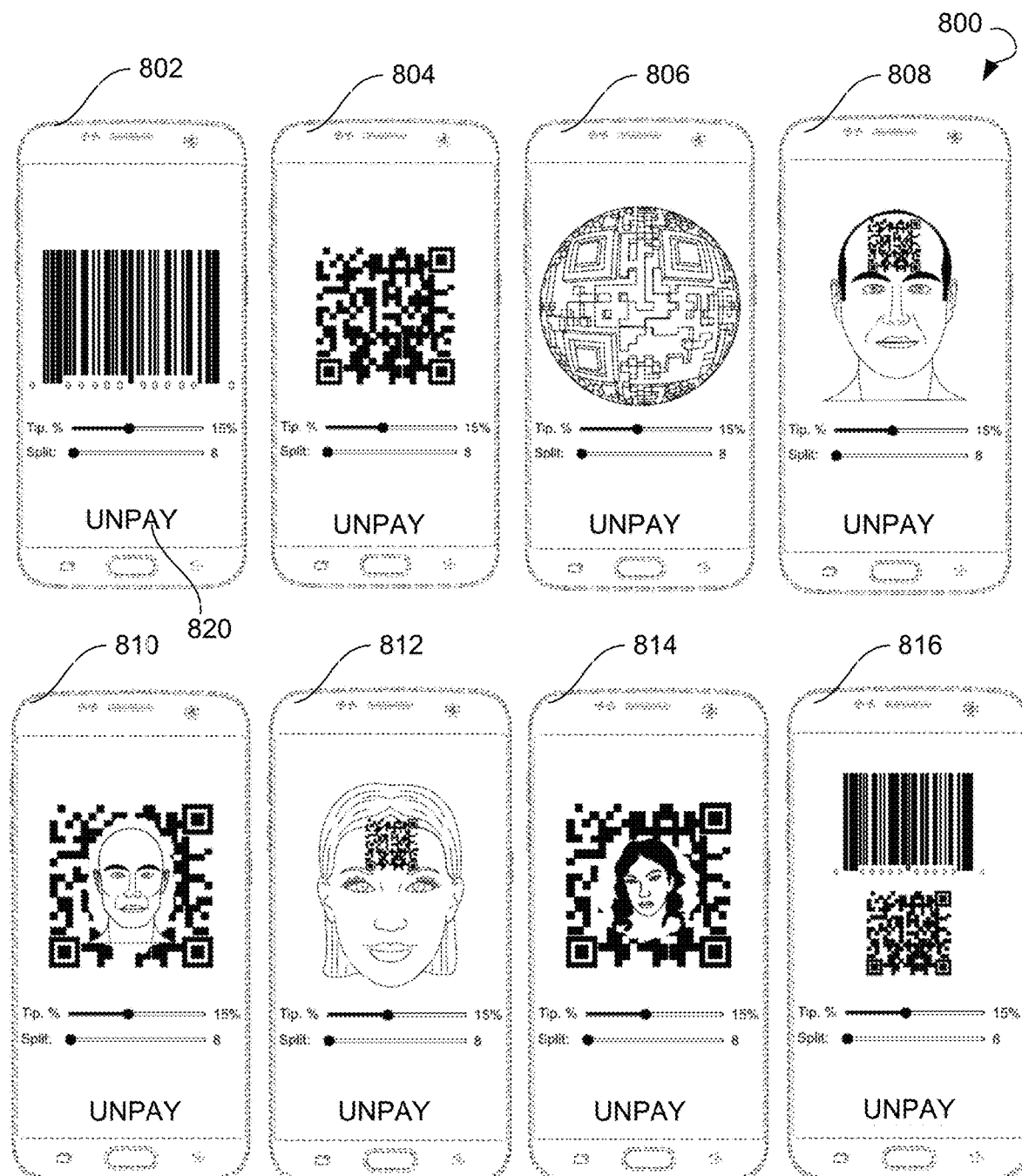
FIG. 8 illustrates various representations of digital currency, in accordance with an example embodiment.

FIG. 8 illustrates various representations 800 of digital currency, in accordance with an example embodiment. Representations 800 show user interfaces of a mobile and wearable device, such as a smartphone, including optical codes encoding data associated with the user. The user interfaces may include an interface 802 with a barcode, an interface 804 with a QR code, an interface 806 with a UNcode, an interface 808 with a QR code integrated into an image provided by the user, an interface 810 with an image provided by the user integrated in a QR code, an interface 812 with a QR code integrated into an image provided by the user, an interface 814 with an image provided by the user integrated in a QR code, an interface 816 with a barcode and a QR code. In an example embodiment, user interfaces may include settings associated with digital and virtual payments. Example settings may include setting percentage of a tip to be added to the payment and specifying a number of persons, between which the payment is to be split. In an example embodiment, an application running on the mobile and wearable device and associated with a system for digital currency transfers via the mobile and wearable device may be referred to as "UNPAY," as shown by element 820.

Figure 9:
FIG. 9 illustrates various representations of digital currency, in accordance with an example embodiment.

FIG. 9 illustrates various representations 900 of digital currency, in accordance with an example embodiment. Representations 900 show user interfaces of a mobile and wearable device, such as a smart watch, including optical codes encoding data associated with the user. The user interfaces of a smart watch may include an interface 902 with a barcode and a QR code, an interface 904 with a barcode, an interface 906 with a QR code, an interface 908 with a UNcode, an interface 910 with a QR code integrated into an image provided by the user, an interface 912 with an image provided by the user integrated in a QR code. In an example embodiment, user interfaces may include settings associated with digital and virtual payments. Example settings may include setting percentage of a tip to be added to the payment and specifying a number of persons, between which the payment is to be split.

The digital currency may include virtual currencies, cryptocurrencies, digital money, electronic money, electronic currency or central bank issued digital base money, a money balance recorded electronically on a stored-value card, virtual payment card or mobile and wearable devices. Another form of digital electronic money is network money, allowing the transfer of value on computer networks, particularly the Internet. Digital money can either be centralized, where there is a central point of control over the money supply, or decentralized, where the control over the money supply can come from various sources in a global computer digital ledger.

The digital currency may be a type of currency, available in a digital form and not available in physical form, which exhibits properties similar to physical currencies and allows for instantaneous transactions and borderless transfer-of-ownership. Like traditional money, the digital currency may be used to buy physical goods and services. In an example embodiment, the digital currency may be restricted to certain communities, such as for use inside an on-line game or social network.

The digital currency may be a digital asset designed as a decentralized cryptocurrency to work as a medium of exchange that uses cryptography to secure its transactions, to control the creation of additional units, and to verify the transfer of assets. The cryptocurrency may be classified as a subset of digital currencies and as a subset of alternative digital currencies and virtual currencies. The cryptocurrency may use decentralized control as opposed to centralized electronic money and central banking systems. The decentralized control of the cryptocurrency works through a code block file chain (BLOCKCHAIN), which is a public transaction database, functioning as a distributed ledger with private key to perform peer to peer transactions.

In an example embodiment, the BLOCKCHAIN is a global public ledger for digital currencies of 206 countries. The BLOCKCHAIN records digital currencies transactions without any trusted international central authority: the maintenance of the BLOCKCHAIN is performed by a network of communicating nodes running BLOCKCHAIN software. Transactions of in the digital currency are broadcast to BLOCKCHAIN network using readily available software applications.

BLOCKCHAIN network nodes can validate transactions, add them to their copy of the ledger, and then broadcast these ledger additions to other nodes. The BLOCKCHAIN may be a distributed database—to achieve independent verification of the chain of ownership of any and every digital currency amount, each network node may store its own copy of the BLOCKCHAIN. A new group of accepted transactions, a block, may be created substantially multiple time during an hour, added to the BLOCKCHAIN, and published to all nodes. This allows digital currency software to determine when a particular digital currency amount has been spent, which is necessary in order to prevent double-spending in an environment without central oversight. Whereas a conventional ledger records the transfers of actual bills or promissory notes that exist apart from it, the BLOCKCHAIN is the only place that digital currency can be said to exist in the form of unspent outputs of transactions.

In an example embodiment, the digital currency includes a UNPAY. The UNPAY may be a combined digital currency of 206 countries. UNPAY transactions may be defined using a Forth-like scripting language and consist of one or more inputs and one or more outputs. When a user sends digital currency, the user designates each address and the amount of digital currency being sent to that address in an output. To prevent double spending, each input must refer to a previous unspent output in the BLOCKCHAIN. The use of multiple inputs corresponds to the use of multiple UNPAY in a cash transaction. Since transactions may have multiple outputs, users can send UNPAY to multiple recipients in one transaction. As in a cash transaction, the sum of inputs (UNPAY used to pay) can exceed the intended sum of payments. In such a case, an additional output is used, returning the change back to the payer. Any input not accounted for in the transaction outputs become the transaction fee. Paying a transaction fee is optional, users can choose which transactions to process and prioritize those that pay higher fees. Fees are based on the storage size of the transaction generated, which in turn is dependent on the number of inputs used to create the transaction.

In the BLOCKCHAIN, UNPAY is associated with UNPAY owner addresses. Creating a UNPAY address includes picking a random valid private key and computing the corresponding UNPAY owner address. This computation can be done during a time period substantially less than a second. But the reverse (computing the private key of a given UNPAY address) is mathematically unfeasible. So, users can tell others and make public a UNPAY address without compromising its corresponding private key. Moreover, the number of valid private keys is so vast that it is extremely unlikely someone can compute a key-pair that is already in use and has funds. The vast number of valid private keys makes it unfeasible that brute force could be used for that. To be able to spend the UNPAYs, the owner needs to know the corresponding private key and digitally sign the transaction. The network verifies the signature using the public key. If the private key is lost, the BLOCKCHAIN network or UNPAY network does not recognize any other evidence of ownership; the UNPAYs are then unusable, and effectively lost.

In an example embodiment, the mobile or wearable device includes a virtual wallet which stores the information necessary to transact UNPAYs, for example, the digital credentials for users holdings and allows one to access (and spend) UNPAYs. While wallets are often described as a place to hold or store UNPAYs, due to the nature of the system, UNPAYs are inseparable from the BLOCKCHAIN.

UNPAY may use public-key cryptography, in which two cryptographic keys, one public and one private, are generated. At its most basic, a wallet may be a collection of these keys.

The virtual wallet may include several types of wallets: software wallets, online wallet, and a physical wallet. Software wallets may connect to the network and allow spending UNPAYs in addition to holding the credentials that prove ownership. Software wallets can be split further in two categories: full clients and lightweight clients.

Full clients may be a secure and reliable way of using the network, as trust in external parties is not required. They may verify transactions directly on a local copy of the BLOCKCHAIN or a pruned subset of the UNPAY network. Full clients may check the validity of UNPAY blocks, preventing them from transacting on a chain that breaks or alters network rules. Because of its size and complexity, storing the entire BLOCKCHAIN is not suitable for all computing devices.

Lightweight clients, on the other hand, may consult full clients to send and receive transactions without requiring a local copy of the entire BLOCKCHAIN. This makes lightweight clients much faster to set up and allows them to be used on low-power, low-bandwidth devices such as smartphones. When using a lightweight wallet, however, the user needs to trust the server to a certain degree, as it can report faulty values back to the user. Lightweight clients may follow the longest BLOCKCHAIN and do not ensure it is valid, requiring trust in system UNPAY users.

With both types of software wallets, the users are responsible for keeping their private keys in a secure place.

Besides software wallets, Internet services called online wallets may offer similar functionality, but may be easier to use. In this case, credentials to access funds may be stored with the online wallet provider rather than on the user's hardware. As a result, the user should complete trust in the wallet provider.

Physical wallets store the credentials necessary to spend UNPAYs offline. Examples combine a novelty UNPAY with these credentials printed on metal. Paper wallets may include paper printouts.

UNPAY may have a pseudonymous privacy, which means that funds are not tied to a central bank or real-world entities, but rather UNPAY addresses. UNPAY owners of UNPAY addresses may be not explicitly identified, but all transactions on the BLOCKCHAIN may be public. In addition, UNPAY transactions can be linked to individuals and companies through idioms of use, transactions that spend UNPAYs from multiple inputs may indicate that the inputs may have a common owner and corroborating public transaction data with known information on owners of certain addresses. Additionally, UNPAY exchanges, where UNPAYs are traded for traditional currencies, may be required by law to collect personal information.

In an example embodiment, to heighten financial privacy, a new UNPAY address may be generated for each transaction. Specifically, hierarchical deterministic wallets may generate pseudorandom, rolling addresses for every transaction from a single seed, while only requiring a single passphrase to be remembered to recover all corresponding private keys. UNPAY exchanges and other entities may prove assets, liabilities, and solvency without revealing their addresses using zero-knowledge proofs.

The validity of each UNPAY unit may be provided by the BLOCKCHAIN. The BLOCKCHAIN is a continuously growing list of records, called blocks, which are linked and secured using cryptography. Each block may contain a hash pointer as a link to a previous block, a timestamp and transaction data. The BLOCKCHAIN is resistant to modification of the data. It may be an open, distributed ledger that can record transactions between two parties efficiently and in a verifiable and permanent way. For use as a distributed ledger, the BLOCKCHAIN may be managed by a peer-to-peer network collectively adhering to a protocol for validating new blocks. Once recorded, the data in any given block cannot be altered retroactively without the alteration of all subsequent blocks, which requires collusion of the network majority.

In an example embodiment, a banking account may be associated with a digital or virtual currency account providing for transactions between these accounts. Such transactions, peer-to-peer transfers, and other services related to the digital currency network may be free of any fees. The services related to the digital currency network may be provided on a subscription basis. Subscribers may be identified with one or more of the following: an email address and a mobile phone number. The user may perform a transfer with only an email address or a mobile phone number of a recipient on condition that the recipient is registered with the digital currency network and has an email address and a mobile phone number specified as his identifier.

In some example embodiments, the BLOCKCHAIN is a distributed computing system with high Byzantine fault tolerance. Decentralized consensus may be achieved with the BLOCKCHAIN. It may solve the double spending problem without the need of a trusted authority or central server.

A block time is the average time it takes for the network to generate one extra block in the BLOCKCHAIN. By the time of block completion, the included data becomes verifiable. This is practically when the money transaction takes place, so a shorter block time means faster transactions.

UNPAY may use various time stamp schemes to avoid the need for a trusted third party to timestamp transactions added to the BLOCKCHAIN ledger. Securing a UNPAY cryptocurrency network and achieving distributed consensus may be implemented through requesting users to show ownership of a certain amount of currency or running hashing algorithms to validate electronic transactions.

In an example embodiment, UNPAY mobile or wearable cryptocurrency wallet stores the public and private keys or UNPAY addresses, which can be used to receive or spend the UNPAY cryptocurrency. With the private key, it is possible to write in the public ledger, effectively spending the associated cryptocurrency. With the public key, it is possible for others to send currency to the wallet.

UNPAY cryptocurrency may be pseudonymous rather than anonymous in that the UNPAY cryptocurrency within a wallet may be not tied to people, but rather to one or more specific keys or UNPAY addresses. Thereby, UNPAY cryptocurrency owners may be not identifiable, but all transactions may be publicly available in the BLOCKCHAIN. Still, UNPAY cryptocurrency exchanges may be required by law to collect the personal information of their users.

UNPAY digital currency may include a virtual currency or virtual money, which is issued and controlled by its developers, and used and accepted among the members of a specific virtual community. The virtual currency may be a digital representation of value which is accepted by natural or legal persons as a means of payment and can be transferred, stored or traded electronically.

Figure 10:
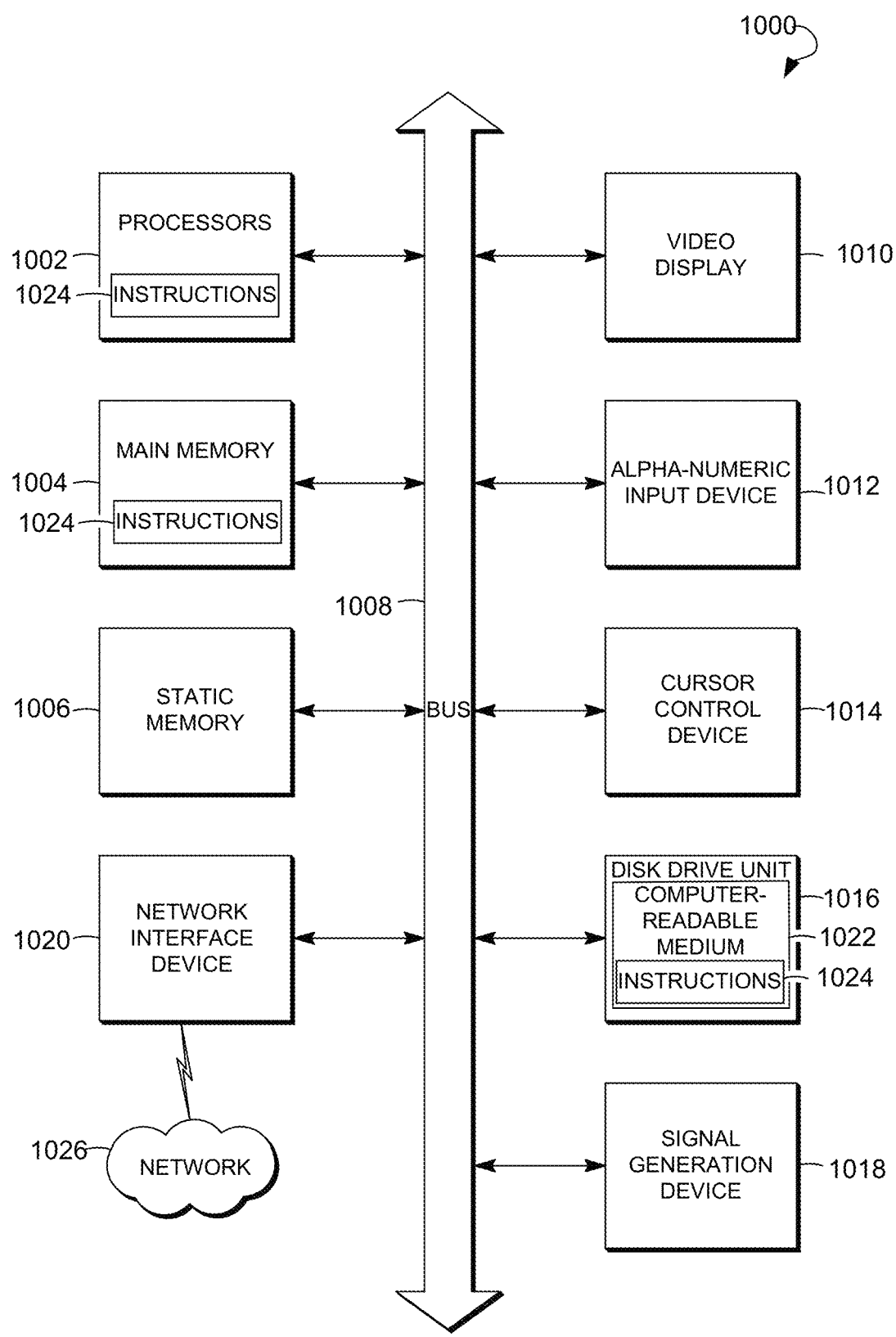
FIG. 10 is a diagrammatic representation of a computing device for a machine in the exemplary electronic form of a computer system, within which a set of instructions for causing the machine to perform any one or more of the methodologies discussed herein can be executed.

FIG. 10 shows a diagrammatic representation of a machine in the example electronic form of a computer system 1000, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 may also include an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a non-transitory computer-readable medium 1022, on which is stored one or more sets of instructions and data structures (e.g., instructions 1024) embodying or utilized by any one or more of the methodologies or functions described herein. The instructions 1024 may also reside, completely or at least partially, within the main memory 1004 and/or within the processors 1002 during execution thereof by the computer system 1000. The main memory 1004 and the processors 1002 may also constitute machine-readable media.

The instructions 1024 may further be transmitted or received over a network 1026 via the network interface device 1020 utilizing any one of a number of well-known transfer protocols (e.g., Hyper Text Transfer Protocol (HTTP)).

While the non-transitory computer-readable medium 1022 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for facilitating mobile device payments, multimedia capture, calling, and messaging via a mobile and wearable device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A system for digital currency transfers via a mobile and wearable device, the system comprising:
   a processor configured to:
      receive over a data network, from the mobile and wearable device of a user, a transfer request, wherein the transfer request includes a transfer amount in digital currency and user identification data associated with the user;
      in response to the transfer request, retrieve, from a storage unit, payment data of the user associated with the identification data;
      based on the retrieving and the transfer amount, generate an optical code encoding the payment data and the transfer amount;
      provide the optical code on a screen of the mobile and wearable device, wherein, on scanning of the optical code, a transfer receiving request is created;
      receive a transfer receiving request to perform a payment transaction associated with the user, the transfer receiving request including at least the payment data, the transfer amount, and recipient identification data associated with a recipient;
      based on the transfer receiving request, access a user account maintained by a currency issuance unit;
      transfer the transfer amount in the digital currency to a recipient account associated with the recipient identification data;
   a currency issuance unit connected over the data network to and remotely located from the processor, the recipient, and the mobile and wearable device operable to:
      based on the payment data associated with the user and the user identification data, generate the digital currency, the digital currency having a deposit amount, the deposit amount being at least equal to the transfer amount requested by the user in the transfer request; and
      provide the digital currency to the user account; and
   a storage unit operable to store at least the user identification information, the payment data of the user, the digital currency, the recipient identification data, wherein the processor, the mobile and wearable device, the currency issuance unit, and the storage unit are remotely located from each other and are in operable connection over the data network;

wherein the mobile and wearable device is associated with a cloud-based application running on the mobile and wearable device, wherein the cloud-based application resides in a cloud network and is provided on the mobile and wearable device via one or more of the following: a web browser, a graphical user interface, a projector, a hologram, an augmented reality (AR) device; a virtual reality (VR) device;

wherein the cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone;

wherein the cloud-based application is provided free of charge or at a predetermined price;

wherein the cloud-based application includes at least a bank account emulation (BAE) client, the BAE client is configured to provide emulation of a bank account to combine with cloud computing and provide an emulated digital currency, wherein the digital currency provided to the user account by the currency issuance unit includes the emulated digital currency, wherein the digital currency is valid on the user account for a predetermined amount of time for the transferring of the transfer amount in the digital currency to the recipient account, wherein the bank account is emulated based on metadata associated with the user, a phone number associated with the user, and data associated with a point-of-sale (POS) terminal of the merchant, wherein the BAE client is configured to provide a virtual representation of an emulated bank account;

wherein the operating system associated with the mobile and wearable device is configured to run the BAE client, provide two communication paths for NFC commands from the POS terminal based on an application identifier (AID) associated with the BAE client;

wherein the operating system is configured to use the AID to route the NFC commands to the cloud-based application managing the emulation of the bank account;

wherein when the user presents the emulated digital currency for transaction, an NFC command is routed to the BAE client for verification of the NFC commands by the cloud-based application managing the emulation of the bank account;

wherein the cloud-based application is configured to connect to a backend associated with the currency issuance unit to complete the transaction;

wherein the cloud-based application is associated with a trusted tokenization node, the trusted tokenization node being a shared resource used to generate and de-tokenize tokens representing data associated with the digital currency at the backend associated with the issuance unit;

wherein the BAE client provides multi-level security by providing limited use keys, tokenization, device biometric recognition, and dynamic risk analysis, wherein the limited use keys are derived from a master domain key shared by the issuance unit, wherein a use of the limited use keys is associated with time to live of the limited use keys and a number of transactions to be performed using the limited use keys, wherein the device biometric recognition is based on fingerprints profiles or face profiles associated with the mobile and wearable device and are used to determine that transactions are initiated only by an authorized mobile and wearable device at recognized locations of the POS terminal;

wherein the digital currency includes a universal (UN) electronically issued digital currency used in one or more of the following: a plurality of countries, a plurality of geographic regions, and one or more currency unions;

wherein the UN digital currency is an official digital currency of a group of 206 countries and one or more territories of the Earth, wherein the group is known as a UN zone or a UN area, wherein the group is associated with the largest most traded digital currency market;

wherein the UN digital currency facilitates electronic funds transfers throughout the world using one or more of UN-branded credit cards, gift cards, and debit cards, UN issues cards, extending credits and setting rates and fees for customers; and wherein the UN digital currency provides financial institutions with UN-branded payment products to be used to offer credits, debits, prepaid and cash-access programs to the customers, and wherein the processor sets a validity period for the digital currency, as selected by the user.

2. The system of claim 1, wherein the processor is further operable to: integrate the optical code in a virtual payment card, wherein the virtual payment card is displayed on the mobile and wearable device to be read by a device associated with the recipient.

3. The system of claim 1, wherein the optical code is selected from a group comprising: a linear dimensional code, a two-dimensional code, a snap tag code, a Quick Response (QR) code, and a three-dimensional (3D) Universal Code LUNcode), wherein the 3D UNcode includes a round global circle and squares arranged in a round circle grid on a white background, the 3D UNcode being readable by an imaging device, wherein the 3D UNcode is a machine-readable optical label encoding information in horizontal, vertical, and 3D components of the round global circle and squares arranged in a round circle grid.

4. The system of claim 1, wherein the processor is further operable to: set a validity period for the digital currency, the validity period being pre-selected by the user and stored in the user account, wherein the digital currency is deactivated upon expiration of the validity period.

5. The system of claim 1, wherein the processor is further operable to:
based on the transferring of the transfer amount in the digital currency to the recipient account, determine that the payment transaction associated with the user is completed; and
based on the determining that the payment transaction is completed, deactivate the digital currency.

6. The system of claim 1, wherein the payment data includes data associated with one or more of the following: a credit card, a debit card, a retail card, a charge card, a bank saving account, a bank checking account, an insurance account, a stored-value card, a cryptocurrency account, and a digital mobile currency.

7. The system of claim 1, wherein the currency issuance unit is selected from one or more of the following: a bank, Federal Reserve Bank, a central bank of 206 countries, a credit card company, an insurance company, a credit union, a store, a public transaction database, a distributed ledger, and a third-party organization.

8. The system of claim 1,
wherein transaction in the UN digital currency worldwide are processed through a Universal Pay (UNPAY) Net system at one or more secure facilities as UNPAY currency;
wherein UN data centers are secured against natural disasters, crime, and terrorism, operate independently of each other and from external utilities, handle up to 35,000 simultaneous transactions and up to 100 billion computations every second, wherein every transaction is checked past 500 variables including 100 fraud-detection parameters including a location and spending habits of the customers and a merchant location;
wherein the UN digital currency is associated with signed copies of sales drafts included in each customer monthly billing statement for verification purposes, wherein the UN digital currency is associated with a summary statement showing a posting date, a purchase date, a reference number, a merchant name, and a dollar amount of each purchase, wherein the UN digital currency is associated with a calculation of a finance charge on an unpaid balance shown on a prior month statement, wherein the UN digital currency is associated with an average daily balance resulting in increased revenue for issuers by calculating a number of days each purchase was included on a prior month statement, in which transactions from previous and current billing cycles were used in the calculation;
wherein the UNPAY currency has a set of rules that govern a participation of financial institutions in a payment system associated with UNPAY currency, wherein acquiring banks are responsible for ensuring that merchants comply with the rules; wherein the rules associated with the UNPAY currency address how a device holder or the cardholder is to be identified for security, how transactions are denied by a bank and how banks cooperate for fraud prevention, and how to keep identification and fraud protection standard and non-discriminatory, wherein the rules govern what creates an enforceable proof of authorization by the device holder or the cardholder;
wherein the rules associated with the UNPAY currency prohibit merchants from imposing a minimum or maximum purchase amount in order to accept, by a user of a mobile or wearable device, from charging device holders, a fee for using UN virtual card payments, wherein a discount for users of the UNPAY currency is permitted under the rules;
wherein the rules associated with the UNPAY currency permit merchants to ask for a photo identification (ID), wherein when the UN virtual card is signed, a merchant does not deny a transaction if a UN virtual cardholder refuses to show the photo ID;
wherein the rules include addition of exceptions for non-signed purchases by telephone or on the Internet, and an additional security system for purchases on the Internet is enforced.

9. The system of claim 8, wherein the UNPAY currency is associated with a contactless payment technology enabling device holders to wave a wearable device in front of contactless payment terminals without the need to physically swipe or insert a virtual card into a point-of-sale device, using RFID technology, wherein the UNPAY currency is associated with a chip-only and a PIN-only debit card;
wherein the UNPAY currency is associated with a mobile payment application or a wearable device application enabling payments via smartphones using a QR code and machine readable codes;
wherein the UNPAY currency is associated with an UNPAY checkout system including an online or offline payment system for removing the need to share card details with retailers, wherein the UNPAY checkout system enables users to enter all user personal details and card information upfront, use a single username and password to make purchases from online or offline retailers, wherein the UNPAY checkout system works with credit cards, debit cards, and prepaid cards;
wherein the rules associated with the UNPAY currency stipulate a user signature requirement to be optional for all Europay, MasterCard and VISA (EMV) contact or contactless chip-enabled merchants leading to a faster in-store purchase experience of the customers.

10. A method for digital currency transfers via a mobile and wearable device, the method comprising:
receiving over a data network, by a processor, from the mobile and wearable device of a user, a transfer request, wherein the transfer request includes a transfer amount in digital currency and user identification data associated with the user;
in response to the transfer request, retrieving, from a storage unit, payment data of the user associated with the identification data;
based on the retrieving, generating an optical code encoding the payment data and the transfer amount;
providing the optical code on a screen of the mobile and wearable device, wherein, on scanning of the optical code, a transfer receiving request is created;
receiving a transfer receiving request to perform a transaction associated with the user, the transaction request including at least the payment data, the transfer amount, and recipient identification data associated with a recipient;
based on the transfer receiving request, accessing a user account maintained by a currency issuance unit;
transferring the transfer amount in the digital currency to a recipient account associated with the recipient identification data;
wherein the processor, the mobile and wearable device, the currency issuance unit, and the storage unit are remotely located with each other and in operable connection over the data network;
wherein the mobile and wearable device is associated with a cloud-based application running on the mobile and wearable device, wherein the cloud-based application resides in a cloud network and is provided on the mobile and wearable device via one or more of the following: a web browser, a graphical user interface, a projector, and a hologram, an augmented reality (AR) device; a virtual reality (VR) device;
wherein the cloud-based application is provided for purchasing in one or more applications stores, the one or more applications stores being associated with an operating system running on the mobile and wearable device, the operating system including one of the following: Microsoft Windows, Linux, Android, Blackberry, iOS, and Windows Phone;
wherein the cloud-based application is provided free of charge or at a predetermined price;
wherein the cloud-based application includes at least a bank account emulation (BAE) client, the BAE client is configured to provide emulation of a bank account to combine with cloud computing and provide an emulated digital currency, wherein the digital currency provided to the user account by the currency issuance unit includes the emulated digital currency, wherein the digital currency is valid on the user account for a predetermined amount of time for the transferring of the transfer amount in the digital currency to the recipient account, wherein the bank account is emulated based on metadata associated with the user, a phone number associated with the user, and data associated with a point-of-sale (POS) terminal of the merchant, wherein the BAE client is configured to provide a virtual representation of an emulated bank account;

wherein the operating system associated with the mobile and wearable device is configured to run the BAE client, provide two communication paths for NFC commands from the POS terminal based on an application identifier (AID) associated with the BAE client;

wherein the operating system is configured to use the AID to route the NFC commands to the cloud-based application managing the emulation of the bank account;

wherein when the user presents the emulated digital currency for the transaction, an NFC command is routed to the BAE client for verification of the NFC commands by the cloud-based application managing the emulation of the bank account;

wherein the cloud-based application is configured to connect to a backend associated with the currency issuance unit to complete the transaction;

wherein the cloud-based application is associated with a trusted tokenization node, the trusted tokenization node being a shared resource used to generate and de-tokenize tokens representing data associated with the digital currency at the backend associated with the issuance unit;

wherein the BAE client provides multi-level security by providing limited use keys, tokenization, device biometric recognition, and dynamic risk analysis, wherein the limited use keys are derived from a master domain key shared by the issuance unit, wherein a use of the limited use keys is associated with time to live of the limited use keys and a number of transactions to be performed using the limited use keys, wherein the device biometric recognition is based on fingerprints profiles or face profiles associated with the mobile and wearable device and are used to determine that transactions are initiated only by an authorized mobile and wearable device at recognized locations of the POS terminal;

wherein the digital currency includes a universal (UN) electronically issued digital currency used in one or more of the following: a plurality of countries, a plurality of geographic regions, and one or more currency unions;

wherein the UN digital currency is an official digital currency of a group of 206 countries and one or more territories of the Earth, wherein the group is known as a UN zone or a UN area, wherein the group is associated with the largest most traded digital currency market;

wherein the UN digital currency facilitates electronic funds transfers throughout the world using one or more of UN-branded credit cards, gift cards, and debit cards, UN issues cards, extending credits and setting rates and fees for customers; and wherein the UN digital currency provides financial institutions with UN-branded payment products to be used to offer credits, debits, prepaid and cash-access programs to the customers, and setting, by the processor, the validity period for the digital currency, as selected by the user.

11. The method of claim 10, further comprising integrating the optical code in a virtual payment card, wherein the virtual payment card is displayed on the mobile and wearable device to be read by a device associated with the recipient;

wherein the optical code is selected from a group comprising: a linear dimensional code, a two-dimensional code, a snap tag code, a Quick Response (QR) code, and a three-dimensional (3D) Universal Code (UNcode), wherein the 3D UNcode includes a round global circle and squares arranged in a round circle grid on a white background, the 3D UNcode being readable by an imaging device, wherein the 3D UNcode is a machine-readable optical label encoding information in horizontal, vertical, and 3D components of the round global circle and squares arranged in a round circle grid;

wherein the information is encoded using five standardized encoding modes including globeing, numeric, alphanumeric, byte/binary, and kanji to store data;

wherein the 3D UNcode is used for product tracking, item identification, time tracking, document management, general marketing, payments, storing bank account information or credit card information, cryptographic currencies.

12. The method of claim 10, further comprising setting, by the currency issuance unit, a validity period for the digital currency, the validity period being pre-selected by the user and stored in the user account, wherein the digital currency is deactivated upon expiration of the validity period, wherein the currency issuance unit is selected from one or more of the following: a bank, Federal Reserve Bank, a credit card company, an insurance company, a credit union, a store, a public transaction database, a distributed ledger, and a third-party organization.

13. The method of claim 10, further comprising:
based on the transferring of the payment amount in the digital currency to the recipient account, determining that the payment transaction associated with the user is completed;
upon determining that the payment transaction associated with the user is completed, checking, by the processor, whether a portion of the deposit amount is present on the digital currency;
transferring, by the processor, the portion of the payment amount from the digital currency to a currency associated with the user, the currency being determined based on the payment data, wherein the payment data includes data associated with one or more of the following: a credit card, a debit card, a retail card, a charge card, a bank saving account, a bank checking account, an insurance account, a stored-value card, a cryptocurrency account, and a digital mobile currency.

14. The method of claim 10, further comprising:
receiving, by the processor, the user authentication information; and
storing the user authentication information in a memory associated with the mobile and wearable device,
wherein the user authentication information includes one or more of the following: a name of the user, an address of the user, a guarantor name, a social security number of the user, a phone number of the user, an identification number of the user, a bank account of the user, an insurance account number of the user, an email address of the user, and a photograph of the user.

15. The method of claim 10, wherein the digital currency is associated with an exchange rate between two digital currencies, the exchange rate being a rate at which one digital currency is exchanged for another digital currency;
wherein the exchange rate is determined in a foreign exchange market, the foreign exchange market being open to a plurality of types of buyers and sellers, and wherein a currency trading is continuous; wherein the exchange rate includes a spot exchange rate associated with a current exchange rate; wherein the exchange rate further includes a forward exchange rate including an exchange rate that quoted and traded on a current date for delivery and payment on a specific future date; and wherein the exchange rate further includes a buying rate and a selling rate, wherein the buying rate is a rate at which a person buys foreign currency in exchange for the digital currency, and the selling rate is a rate at which the person sells the digital currency.

16. The method of claim 10, wherein the digital currency includes a virtual currency, a cryptocurrency, digital money, electronic money, electronic currency, and central bank issued digital base money, a money balance recorded electronically on a stored-value card, virtual payment card, or mobile and wearable devices, network money allowing transferring of value on computer networks, the computer networks including Internet;
wherein the digital currency is a type of currency available in a digital form and absent in a physical form, the digital currency having properties similar to physical currencies and allowing for instantaneous transactions, borderless transfer-of-ownership, buying physical goods and services;
wherein the digital currency is restricted for use in one or more communities, the one or more communities including an on-line game and a social network;
wherein the digital currency includes one of the group: a centralized currency with money supply controlled by a central point of control and a decentralized currency with money supply coming from a plurality of sources in a global computer digital ledger;
wherein the digital currency is a digital asset designed as a decentralized cryptocurrency to work as a medium of exchange that uses cryptography to secure transactions performed in the digital currency, to control creation of additional units, and to verify transmitting of assets;
wherein the decentralized cryptocurrency, being a subset of digital currencies, alternative digital currencies, and virtual currencies, is controlled through a code block file chain (blockchain), the blockchain being a public transaction database, which functions as a distributed ledger with private key to perform peer-to-peer transactions;
wherein the blockchain is a global public ledger for 206 countries, the global public ledger recording transactions in the digital currency;
wherein the digital currency functions in absence of a trusted international central authority with maintenance of the blockchain performed by a network of communicating nodes running software associated with the blockchain;
wherein the transactions in the digital currency are broadcast to a network associated with the blockchain using one or more readily available software applications;
wherein a node of the network of communicating nodes validates the transactions, adds the transactions to a copy of the global public ledger associated with the node, and broadcast the additions to other nodes of the network of communicating nodes;
wherein the broadcasting of the additions is performed a plurality times per hour, wherein the additions form a block added to the blockchain;
wherein the broadcasting provides for determining a calendar time of spending one or more amounts in the digital currency and preventing double-spending in an environment without central oversight;
wherein the digital currency exists in the blockchain as unspent outputs of the transactions.

17. The method of claim 10, wherein the digital currency includes a Universal Pay (UNPAY) currency, wherein the UNPAY is a virtual currency, which is issued and controlled by developers of the virtual currency, and used and accepted among members of a virtual community;
wherein the transactions in the UNPAY consisting of at least one input and at least one output, wherein the at least one output is associated with a UNPAY transfer and includes a destination address and an amount in the UNPAY of the UNPAY transfer, and the at least one input refers to an unspent output in the blockchain to prevent double spending;
wherein using of multiple inputs corresponds to using of multiple UNPAYs in a cash transaction, wherein a sum of inputs exceeds a total of payments;
wherein an unaccounted input is handled as a transaction fee;
wherein paying the transaction fee is optional;
wherein the user chooses one or more priority transactions based on fee amounts associated with the one or more priority transactions, the one or more priority transactions being processed before other transactions;
wherein a fee amount associated with the transaction is based on a number of inputs used to create the transaction and a storage size of the transaction;
wherein the UNPAY is associated with a UNPAY address of an owner of the UNPAY, wherein creating the UNPAY address is picking a random private key and computing the UNPAY address to be assigned to the owner;
wherein the computing is performed substantially less than during one second and a reverse computing of the private key of the UNPAY address is mathematically unfeasible;
wherein a number of private keys hinders a probability of brute force computing of a key-pair being in use;
wherein spending the UNPAY is permitted on digitally signing the transaction, the signature being verified by the private key associated with the owner;
wherein in case of losing the private key, the UNPAY associated with the private key becomes unusable;
wherein the virtual currency is a digital representation of value which is accepted by natural or legal persons as a means of payment and suitable to be transferred, stored, and traded electronically;
wherein the user of the UNPAY provides at least one image, the at least one image being depicted on the virtual payment card, the at least one image including a face of the user, an image of a public figure, an image of a movie character, and other images with optical code including 1D, 2D and 3D UNcode.

18. The method of claim 17, wherein the digital currency uses public-key cryptography based on generating a public key and a private key;

wherein the mobile or wearable device functions as a virtual wallet and stores information necessary to perform transaction in the digital currency, the information including a collection of at least one public key and at least one private key;

wherein the virtual wallet being a software wallet connecting to a network and providing for spending the digital currency, the software wallet includes: a full client and a lightweight client;

wherein the full client verifies the transactions directly on a local copy of the blockchain or a pruned subset of the network associated with the digital currency network to eliminate necessity for trust as in case of external parties, checks validity of blocks of the digital currency, preventing the blocks from transacting on a chain that breaks or alters network rules;

wherein a lightweight client consults the full client to send and receive the transactions without requiring a local copy of the blockchain, the lightweight client being suitable for use on low-power, low-bandwidth devices, the lightweight client following longest blockchain and not ensuring validity;

wherein the software wallet includes an online wallet storing the information with a provider of the online wallet;

wherein the software wallet includes a physical wallet storing the information offline, the storing offline including printing on metal and printing on paper.

19. The method of claim 18, wherein the digital currency has a pseudonymous privacy with funds being tied to the digital currency address instead of a central bank or a real-world entity;

wherein the owner of the digital currency address is not explicitly identified;

wherein the transactions on the blockchain are public;

wherein the transactions are linked to individuals and companies through idioms of use;

wherein the transactions that spend the digital currency from multiple inputs indicate a common owner and corroborating public transaction data with known information on owners of certain addresses;

wherein exchange of the digital currency for traditional currencies is required by law to collect personal information;

wherein a new digital currency address is generated for each transaction to increase financial privacy;

wherein a hierarchical deterministic wallet generates pseudorandom rolling addresses for every transaction from a single seed, while only requiring a single passphrase to be remembered to recover private keys associated with the owner;

wherein a digital currency exchange proves assets, liabilities, and solvency without revealing addresses using zero-knowledge proofs;

wherein validity of the digital currency is provided by the blockchain, the blockchain being a continuously growing list of blocks linked and secured using cryptography;

wherein each of the blocks contains a hash pointer as a link to a previous block, a timestamp, and transaction data; and data in each of the blocks cannot be altered retroactively without alteration of all subsequent blocks, which requires collusion of network majority;

wherein the blockchain is an open, distributed ledger operable to record transactions between two parties in a manner resistant to modification of the transaction data;

wherein the blockchain is managed by a peer-to-peer network collectively adhering to a protocol for validating new blocks;

wherein block time is an average time for the network to generate one extra block in the BLOCKCHAIN, the data associated with the one extra block becomes verifiable on completion of the generating.

20. The method of claim 19, wherein the digital currency uses time stamp schemes to avoid need for a trusted third party to timestamp transactions added to a ledger of the blockchain ledger;

wherein cryptocurrency network of the digital currency is secured and brought in distributed consensus through requesting users to show ownership of a certain amount of the digital currency or running hashing algorithms to validate electronic transactions;

wherein the cryptocurrency network is associated with at least one cryptocurrency account and at least banking account, the cryptocurrency network being configured to perform transaction between the at least banking account and the at least one cryptocurrency account, wherein services of cryptocurrency network are free;

wherein the services are provided on a subscription basis and subscribers are identified with one or more of the following: an email address and a mobile phone number;

wherein a mobile or wearable cryptocurrency wallet stores public and private keys or one or more digital currency addresses used to receive and spend the digital currency;

wherein writing in a public ledger to spend the digital currency is performed a private key;

wherein a public key enables to send the digital currency to a wallet;

wherein the digital currency is pseudonymous, the digital currency being tied to one or more keys or digital currency addresses;

wherein the owner of the digital currency is not identifiable, while the transactions are publicly available in the blockchain.

* * * * *